(12) United States Patent
Torii et al.

(10) Patent No.: US 11,275,547 B2
(45) Date of Patent: Mar. 15, 2022

(54) DISPLAY SYSTEM, DISPLAY METHOD, AND PROGRAM

(71) Applicant: SEIKO EPSON CORPORATION, Tokyo (JP)

(72) Inventors: Shinya Torii, Azumino (JP); Shinichi Kobayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/131,843

(22) Filed: Dec. 23, 2020

(65) Prior Publication Data

US 2021/0200495 A1 Jul. 1, 2021

(30) Foreign Application Priority Data

Dec. 26, 2019 (JP) .............................. JP2019-235894

(51) Int. Cl.
| | | |
|---|---|---|
| *G06F 3/01* | (2006.01) | |
| *G06F 3/0488* | (2013.01) | |
| *G06F 3/14* | (2006.01) | |
| *G06F 3/16* | (2006.01) | |
| *G02B 27/01* | (2006.01) | |

(52) U.S. Cl.
CPC ....... *G06F 3/1423* (2013.01); *G02B 27/0172* (2013.01); *G06F 3/016* (2013.01); *G06F 3/0488* (2013.01); *G06F 3/167* (2013.01); *G02B 2027/014* (2013.01); *G02B 2027/0178* (2013.01)

(58) Field of Classification Search
CPC ...... G06F 3/1423; G06F 3/016; G06F 3/0488; G06F 3/167; G02B 27/0172; G02B 2027/014; G02B 2027/0178
See application file for complete search history.

(56) References Cited

U.S. PATENT DOCUMENTS

| | | | |
|---|---|---|---|
| 2015/0015479 A1* | 1/2015 | Cho ...................... | G06F 3/1423 345/156 |
| 2017/0115728 A1* | 4/2017 | Park ................... | G02B 27/0093 |
| 2017/0322622 A1* | 11/2017 | Hong ..................... | G06F 3/012 |
| 2017/0337897 A1* | 11/2017 | Jung ..................... | G06F 3/0346 |
| 2018/0143433 A1* | 5/2018 | Fujimaki ................ | G06F 3/016 |
| 2018/0150996 A1* | 5/2018 | Gatta ..................... | G06F 1/163 |
| 2018/0173401 A1* | 6/2018 | Kim .................. | H04M 1/72406 |
| 2019/0056813 A1* | 2/2019 | Fukuda ............. | H04M 1/72412 |
| 2020/0112711 A1* | 4/2020 | Enriquez ................ | G06F 3/012 |

FOREIGN PATENT DOCUMENTS

JP 2019-036914 A 3/2019

* cited by examiner

*Primary Examiner* — Ryan A Lubit
(74) *Attorney, Agent, or Firm* — Oliff PLC

(57) ABSTRACT

A display system includes an HMD and a control device. The control device can execute switching between a plurality of user interfaces. When the user interfaces are switched without change of display of an image display unit, a notification is made by the control device. When the user interfaces are switched with change of display of the image display unit, a notification is made by the HMD.

6 Claims, 15 Drawing Sheets

DISPLAY SYSTEM, DISPLAY METHOD, AND PROGRAM

The present application is based on, and claims priority from JP Application Serial Number 2019-235894, filed on Dec. 26, 2019, the disclosure of which is hereby incorporated by reference herein in its entirety.

BACKGROUND

1. Technical Field

The present disclosure relates to a display system, a display method, and a program.

2. Related Art

There is proposed a technique that allows plural display units that display images to work in a collaborative manner (see, for example, JP-A-2019-036914). The configuration described in JP-A-2019-036914 provides a configuration in which a mobile terminal device having a touch display is coupled to a head-mounted display, and part of a screen displayed on the mobile terminal device is displayed on the head-mounted display to achieve collaborative work.

In the configuration described in JP-A-2019-036914, a user wearing the HMD needs to perform input while viewing the display of the mobile terminal device. Thus, even though the user can optionally view the plural display units, a display unit that the user should view is limited during the input operation.

SUMMARY

An aspect for solving the problem described above provides a display system including a head-mounted display apparatus that includes a first display unit and is to be mounted on a head of a user, and a control device to be coupled to the head-mounted display apparatus, in which the control device includes a second display unit and a touch sensor disposed so as to overlap with the second display unit, the control device executes switching between a plurality of user interfaces including a first user interface and a second user interface, the first user interface being configured to display a first input screen on the second display unit to detect input on the touch sensor, the second user interface being configured to display a second input screen on the second display unit to detect input on the touch sensor, and a notification is made when the user interfaces are switched.

Another aspect for solving the problem described above provides a display system including a head-mounted display apparatus that includes a first display unit and is to be mounted on a head of a user, and a control device to be coupled to the head-mounted display apparatus, in which the control device includes a second display unit, a touch sensor disposed so as to overlap with the second display unit, an application executing unit configured to execute an application that uses detected data of the touch sensor, a detecting unit configured to acquire the detected data of the touch sensor, and an event informing unit configured to inform the application executing unit of the detected data of the touch sensor and an operation event of the touch sensor, and at least any one of a type of the operation event or the detected data informed by the event informing unit to the application executing unit is changed in accordance with a user interface displayed on the second display unit.

Yet another aspect for solving the problem described above provides a display method by a head-mounted display apparatus that includes a first display unit and is to be mounted on a head of a user, and also by a control device that is to be coupled to the head-mounted display apparatus and includes a second display unit and a touch sensor disposed so as to overlap with the second display unit, the method including, in the control device, switching and executing a plurality of user interfaces including a first user interface and a second user interface, the first user interface being configured to display a first input screen on the second display unit to detect input on the touch sensor, the second user interface being configured to display a second input screen on the second display unit to detect input on the touch sensor, and making a notification when the user interfaces are switched.

Yet another aspect for solving the problem described above provides a program that can be executed by a computer and controls a control device that is to be coupled to a head-mounted display apparatus that includes a first display unit and is to be mounted on a head of a user, the control device including a second display unit and a touch sensor disposed so as to overlap with the second display unit, the program including switching and executing a plurality of user interfaces including a first user interface and a second user interface, the first user interface being configured to display a first input screen on the second display unit to detect input on the touch sensor, the second user interface being configured to display a second input screen on the second display unit to detect input on the touch sensor, and causing a notification to be made when the user interfaces are switched.

DESCRIPTION OF EXEMPLARY EMBODIMENTS

1. Configuration of Display System

Below, embodiment to which the present disclosure is applied will be described with reference to the drawings.

Figure 1:
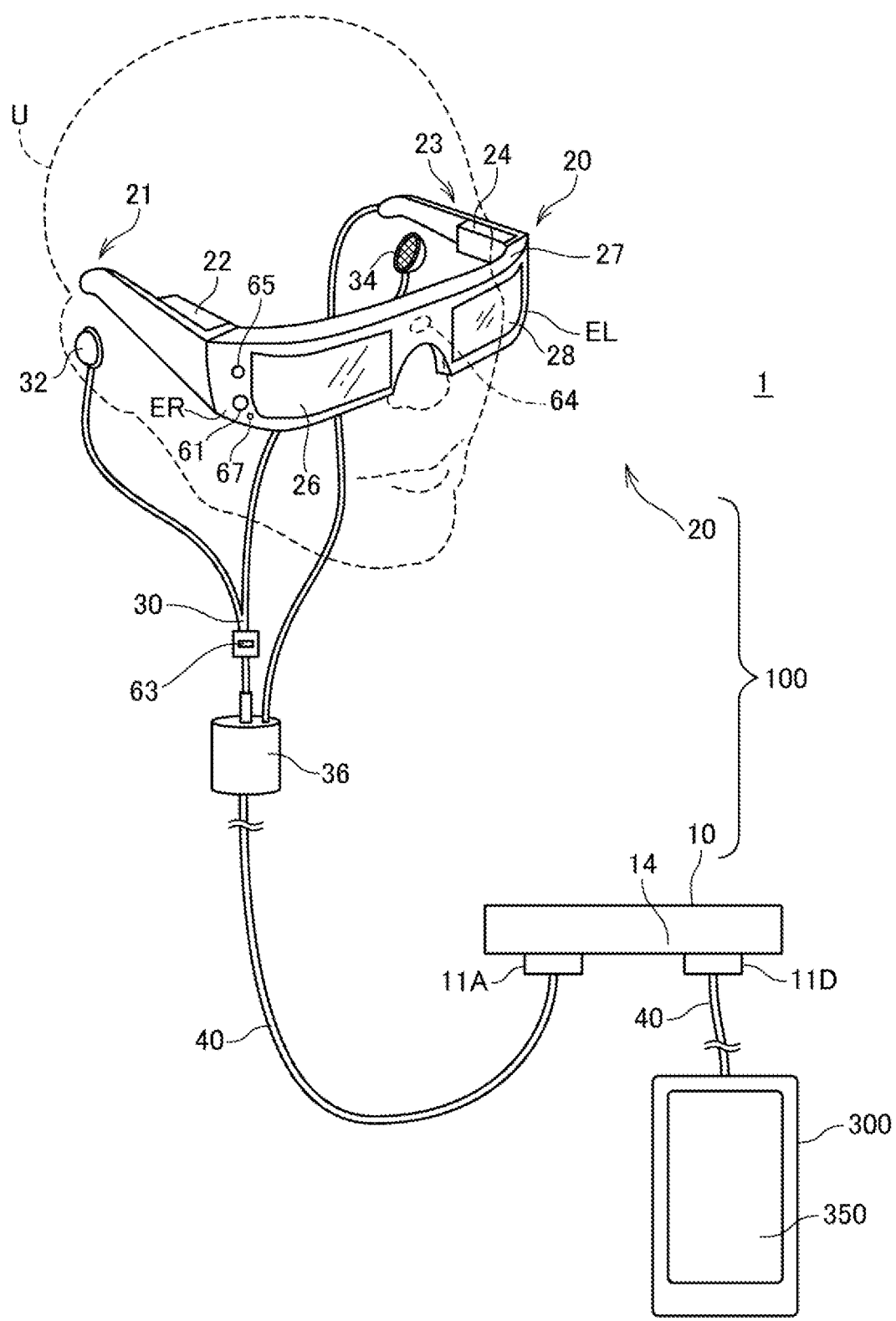
FIG. 1 is a diagram illustrating a schematic configuration of a display system.

FIG. 1 is a diagram illustrating a schematic configuration of a display system 1.

The display system 1 includes an HMD 100 and a control device 300. The HMD 100 includes an image display unit 20 to be mounted on a head of a user U. The HMD 100 is a display apparatus that causes the user U to visually recognize an image or a video, and serves as an example of a head-mounted display apparatus according to the present disclosure. The HMD stands for a head mounted display.

The HMD 100 includes a connection device 10 coupled to the image display unit 20. The connection device 10 functions as an interface that allows the HMD 100 to be coupled to another device that is different from the HMD 100. In the display system 1, the control device 300 is coupled to the connection device 10.

In the following description and drawings, a prefix DP is attached to the name of each of some functional portions that constitute the HMD 100, whereas a prefix CO is attached to the name of each of some functional portions that constitute the control device 300, for the purpose of convenience of description.

The control device 300 includes a touch panel 350 that functions as a display screen that displays a character or an image and also functions as an operating unit that detects a touch operation or a pressing operation. The control device 300 includes a terminal device having a size that allows the device to be carried. For example, a smart phone can be used. The touch panel 350 includes an LCD 331, which will be described later with reference to FIG. 4, and also includes a touch sensor 336. The LCD stands for a liquid crystal display. The control device 300 may be another type of device such as a desktop personal computer, a notebook personal computer, a tablet-type personal computer, or the like.

The connection device 10 includes a box-shaped case including a connector 11A and a connector 11D. The image display unit 20 is coupled to the connector 11A through a coupling cable 40, whereas the control device 300 is coupled to the connector 11D through a USB cable 46. This allows the image display unit 20 and the control device 300 to be coupled to each other in a manner such that they can send or receive data with each other. For example, the control device 300 outputs, to the image display unit 20, audio data or video data used for the image display unit 20 to display video. For example, the image display unit 20 sends detected data of various types of sensors that the image display unit 20 includes, to the control device 300 as described later. The control device 300 may be able to supply electric power to the image display unit 20. The USB stands for a universal serial bus.

The configuration of coupling the connection device 10 and the control device 300 using the USB cable 46 is given merely as one example. There is no limitation as to the specific form of coupling the connection device 10 and the control device 300. For example, they may be coupled to each other in a wired manner using other types of cables. They may be coupled to each other through wireless communication. For example, in a case of a configuration in which the USB cable 46 is coupled to the connector 11D with the USB Type-C standard, it is possible to supply a DC current of 20 volts using the USB cable 46, and also possible to transmit video data or the like with the HDMI standard as a function of alternate mode of USB Type-C. The HDMI and an MHL are registered trademarks.

The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27 to hold the image display unit 20 at the head of the user U. The right holding part 21 is linked to an end portion ER located at the right side of the user U in the front frame 27. The left holding part 23 is linked to the end portion EL located at the left side of the user U.

The right light-guiding plate 26 and the left light-guiding plate 28 are provided at the front frame 27. The right light-guiding plate 26 is located in front of the right eye of the user U in a state where the user U wears the image display unit 20, and causes the right eye to visually recognize an image. The left light-guiding plate 28 is located in front of the left eye of the user U in a state where the user U wears the image display unit 20, and causes the left eye to visually recognize an image. The right light-guiding plate 26 and the left light-guiding plate 28 are optical parts made out of an optical transparent resin or the like, and are configured to guide imaging light outputted from the right display unit 22 and the left display unit 24, to the eyes of the user U. The right light-guiding plate 26 and the left light-guiding plate 28 each include, for example, a prism.

The front frame 27 has a shape in which one end of the right light-guiding plate 26 and one end of the left light-guiding plate 28 are linked to each other. This linked position corresponds to a position between eyebrows of the user U in a state where the user U wears the image display unit 20. The front frame 27 may include a nose pad abutting the nose of the user U in a state of wearing the image display unit 20, and may be configured to link a belt to the right holding part 21 and the left holding part 23 to hold the image display unit 20 at the head of the user U by using the belt.

Each of the right display unit 22 and the left display unit 24 is a module obtained by making an optical unit and a peripheral circuit into a unit. The right display unit 22 causes an image to be displayed by using the right light-guiding plate 26, whereas the left display unit 24 causes an image to be displayed by using the left light-guiding plate 28. The right display unit 22 is provided at the right holding part 21. The left display unit 24 is provided at the left holding part 23.

The imaging light guided by the right light-guiding plate 26 and the outside light passing through the right light-guiding plate 26 enter the right eye of the user U. Similarly, the imaging light guided by the left light-guiding plate 28 and the outside light passing through the left light-guiding plate 28 enter the left eye. The imaging light from the right light-guiding plate 26 and the left light-guiding plate 28 and the external light passing through the right light-guiding plate 26 and the left light-guiding plate 28 enter the eyes of the user U. This allows the user U to visually recognize the image displayed by the image display unit 20 and the external scene passing through the right light-guiding plate 26 and the left light-guiding plate 28 in a superimposed manner.

A DP illuminance sensor 65 is disposed at the front frame 27. The DP illuminance sensor 65 is a sensor configured to receive the outside light coming from the front of the user U who wears the image display unit 20. The DP illuminance sensor 65 can detect the illuminance of and the amount of the outside light passing through the right light-guiding plate 26 and the left light-guiding plate 28 and entering the eyes of the user U.

A DP outside camera 61 is provided at a position of the front frame 27 where the camera does not block the outside light passing through the right light-guiding plate 26 and the left light-guiding plate 28. The DP outside camera 61 is a digital camera including an imaging element such as a CCD or CMOS, an imaging lens, and the like, and may be a monocular camera or a stereo camera. The angle of view of the DP outside camera 61 includes at least a portion of a range of the external scene that the user U who wears the image display unit 20 visually recognizes through the right light-guiding plate 26 and the left light-guiding plate 28. The DP outside camera 61 may be a wide angle camera, or may be a camera that can image the entire external scene that the user U who wears the image display unit 20 visually recognizes. The CCD stands for a charge coupled device. The CMOS stands for a complementary metal oxide semiconductor.

An LED indicator 67 that emits light during an operation of the DP outside camera 61 is disposed at the front frame 27.

A distance sensor 64 that detects a distance from the measurement target object located in a predetermined measurement direction is provided at the front frame 27. For example, the distance sensor 64 includes a light reflective distance sensor using an LED, a laser diode, or the like, an infrared depth sensor, an ultrasonic distance sensor, and a laser range scanner. The distance sensor 64 may be a distance detecting unit obtained by combining image detection and audio detection, or a device that processes images obtained through stereo imaging using a camera to detect a distance. The measurement direction of the distance sensor 64 is, for example, a direction of the external scene that the user U visually recognizes through the right light-guiding plate 26 and the left light-guiding plate 28.

The right display unit 22 and the left display unit 24 are each coupled to the connection device 10 through the coupling cable 40. The connection cable 40 includes an audio connector 36. A head set 30 is coupled to the audio connector 36. The head set 30 includes a right earphone 32 and a left earphone 34, each of which constitutes a headphone, and a microphone 63. The right earphone 32 and the left earphone 34 output a sound on the basis of an audio signal outputted by the connection device 10. The microphone 63 collects a sound to output an audio signal to the connection device 10.

2. Configuration of Optical System of Image Display Unit

Figure 2:
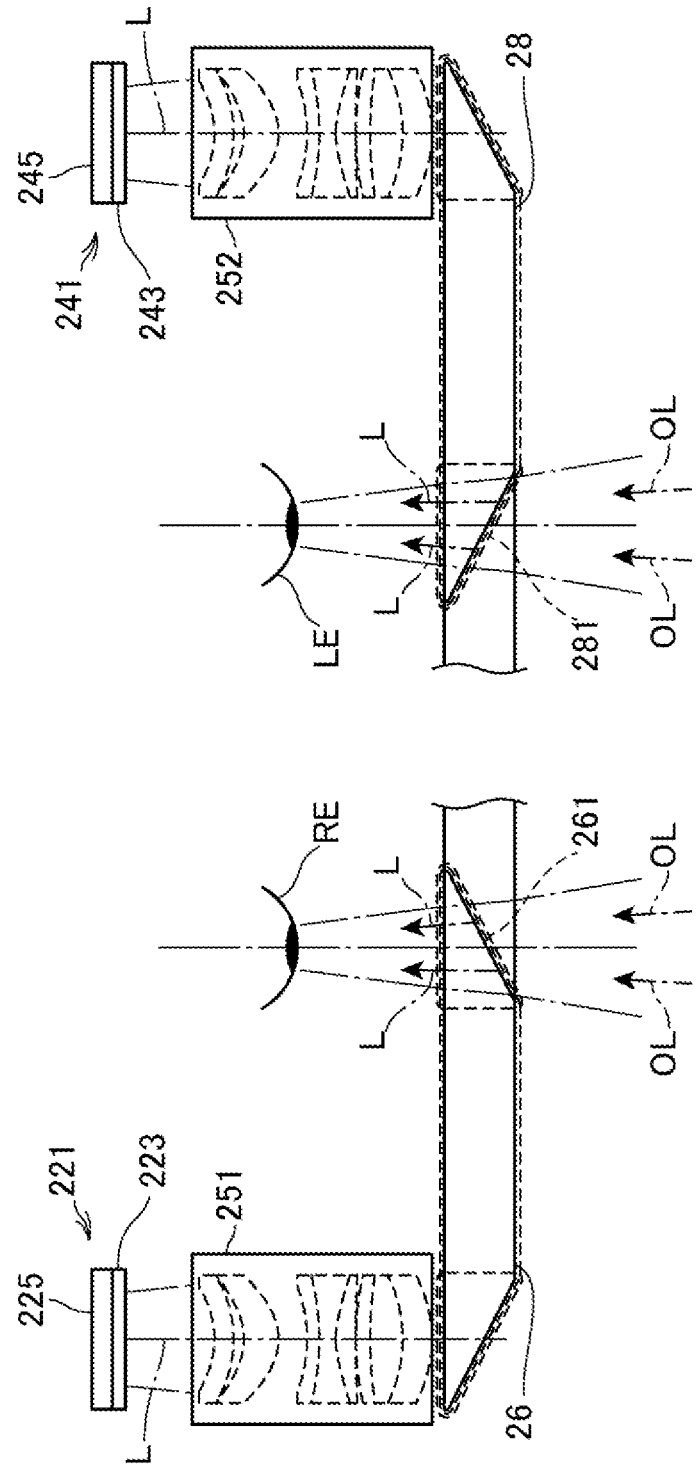
FIG. 2 is a plan view illustrating main portions of a configuration of an optical system of an image display unit.

FIG. 2 is a plan view illustrating main portions of a configuration of an optical system included in the image display unit 20. In FIG. 2, a left eye LE and a right eye RE of a user U are illustrated for the purpose of explanation.

The right display unit 22 and the left display unit 24 are configured, for example, to be left-right symmetrical.

The right display unit 22 includes an OLED unit 221 that emits imaging light, and a right optical system 251 that guides the imaging light L emitted by the OLED unit 221 to the right light-guiding plate 26. The OLED unit 221 and the right optical system 251 serve as a configuration that allows the right eye RE to visually recognize an image. The OLED stands for an organic light emitting diode.

Figure 3:
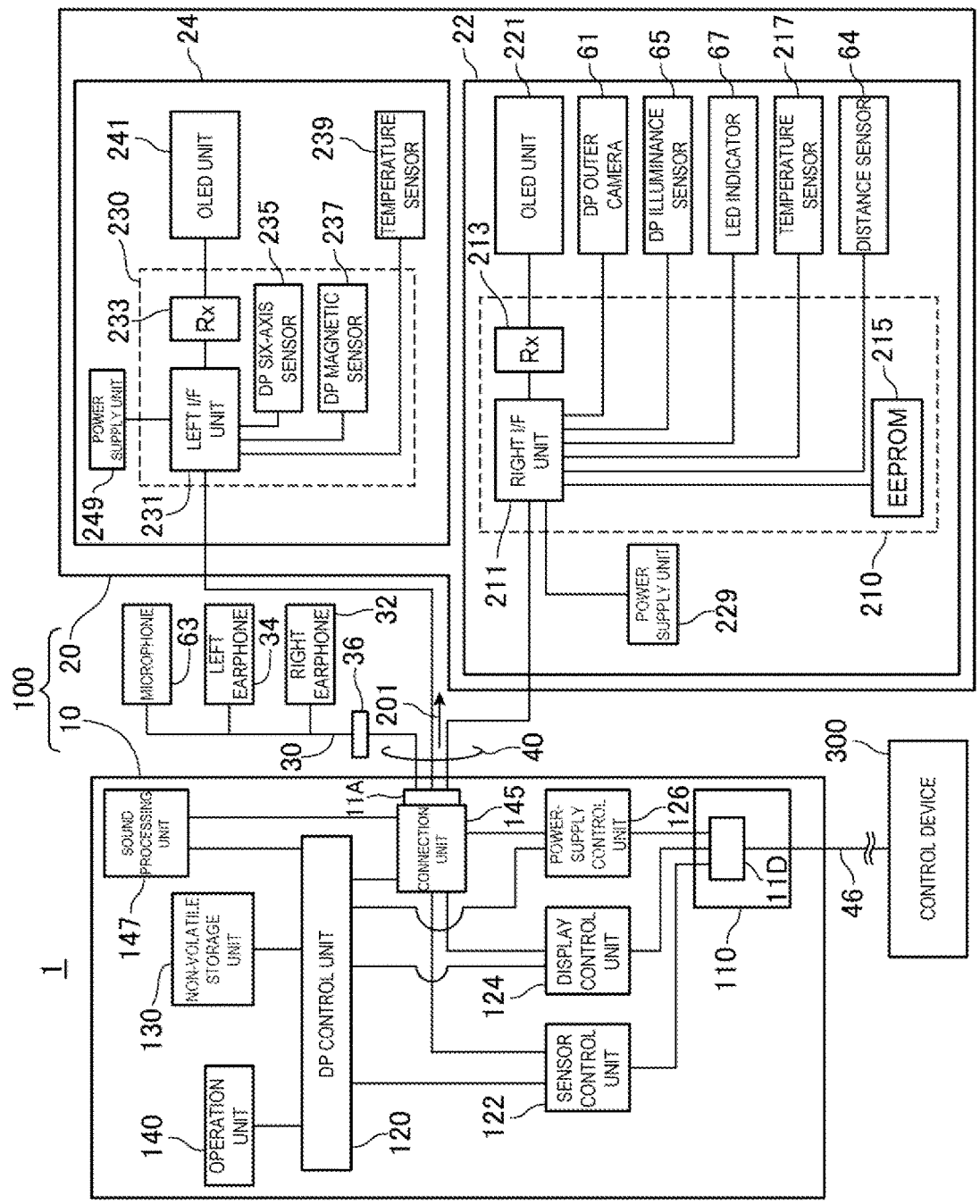
FIG. 3 is a block diagram illustrating the display system.

The OLED unit 221 includes an OLED panel 223 and an OLED drive circuit 225 that drives the OLED panel 223. The OLED panel 223 is a self-light emission type display panel in which light-emitting elements are arranged, the light-emitting elements each emitting color light of R, G, or B, for example. The OLED drive circuit 225 drives the OLED panel 223 in accordance with control of a DP control unit 120. The OLED drive circuit 225 is mounted at a substrate (not illustrated) secured at the back surface of the OLED panel 223, for example. A temperature sensor 217 illustrated in FIG. 3 is mounted at this substrate.

The right optical system 251 uses a collimate lens configured to collimate, into a parallel state, the imaging light L emitted from the OLED panel 223, to cause the light to enter the right light-guiding plate 26. The image light L is reflected on plural reflection surfaces within the right light-guiding plate 26, and is also reflected on a half mirror 261 located in front of the right eye RE to be outputted from the right light-guiding plate 26 toward the right eye RE.

The right display unit 22 includes an OLED unit 241 that emits imaging light, and a left optical system 252 that guides the imaging light L emitted by the OLED unit 241 to the left light-guiding plate 28. The OLED unit 241 and the left optical system 252 serve as a configuration that allows the left eye LE to visually recognize an image.

The OLED unit 241 includes an OLED panel 243, and an OLED drive circuit 245 that drives the OLED panel 243. The OLED panel 243 is a self-light emission type display panel in which light-emitting elements are arranged, the light-emitting elements each emitting color light of R, G, or B, for example, The OLED drive circuit 245 drives the OLED panel 243 in accordance with control of the DP control unit 120. The OLED drive circuit 245 is mounted at a substrate (not illustrated) secured at the back surface of the OLED panel 243, for example. A temperature sensor 239 illustrated in FIG. 3 is mounted at this substrate.

The left optical system 252 uses a collimate lens configured to collimate, into a parallel state, the imaging light L emitted from the OLED panel 243, to cause the light to enter the left light-guiding plate 28. The image light L is reflected on plural reflection surfaces within the left light-guiding plate 28, and is also reflected on the half mirror 261 located in front of the left eye LE to be outputted from the left light-guiding plate 28 toward the left eye LE.

The HMD 100 functions as a see-through type display apparatus. In other words, the imaging light L reflected on the half mirror 261 and the outside light OL passing through the right light-guiding plate 26 enter the right eye RE of the user U. In addition, the imaging light L reflected on the half mirror 281 and the outside light OL passing through the half mirror 281 enter the left eye LE. The HMD 100 superimposes the imaging light L concerning an image processed therewithin and the outside light OL to cause it to enter the eyes of the user U. This allows the user U to view the external scene through the right light-guiding plate 26 and the left light-guiding plate 28. This external scene is superimposed with an image made out of the imaging light L, thereby allowing the user U to visually recognize the image. The half mirrors 261 and 281 each serve as an image extracting unit that reflects imaging light outputted by each of the right display unit 22 and the left display unit 24 to extract an image. The half mirrors 261 and 281 constitute the display unit.

3. Control System of HMD

FIG. 3 is a block diagram illustrating the display system 1, and in particular illustrating the configuration of the HMD 100 in detail.

The right display unit 22 of the image display unit 20 includes a right display unit substrate 210. A right I/F 211 coupled to the coupling cable 40, a reception unit 213, and an EEPROM 215 are mounted at the right display unit substrate 210. The reception unit 213 receives data inputted from the connection device 10 through the right I/F unit 211. The right I/F unit 211 couples the reception unit 213, the EEPROM 215, a temperature sensor 217, the DP outside camera 61, the distance sensor 64, the DP illuminance sensor 65, and the LED indicator 67, to the connection device 10. The reception unit 213 couples the OLED unit 221 to the connection device 10.

The left display unit 24 includes a left display unit substrate 230. A left I/F unit 231 and a reception unit 233 are mounted at the left display unit substrate 230. The left I/F unit 231 is coupled to the coupling cable 40. The reception unit 233 receives data inputted from the connection device 10 through the left I/F unit 231. A DP six-axis sensor 235 and a DP magnetic sensor 237 are mounted at the left display unit substrate 230.

The left I/F unit 231 couples the reception unit 233, the DP six-axis sensor 235, the DP magnetic sensor 237, and the temperature sensor 239 to the connection device 10. The reception unit 233 couples the OLED unit 241 to the connection device 10.

In the description and the drawings according to the present embodiment, the I/F stands for an interface. The EEPROM stands for an electrically erasable programmable read-only memory. The reception unit 213 and the reception unit 233 may be referred to as Rx 213 and Rx 233, respectively.

The EEPROM 215 holds various types of data in a non-volatile manner. For example, the EEPROM 215 holds data concerning light-emitting properties and display properties of the OLED units 221 and 241 provided in the image display unit 20, and also holds data concerning a property of a sensor provided in the right display unit 22 or the left display unit 24. Specifically, the EEPROM 215 holds parameters regarding gamma correction of the OLED units 221 and 241, data used to compensate for detected values of the temperature sensors 217 and 239, and the like, in a manner such that the DP control unit 120 can read.

The DP outside camera 61 captures an image in accordance with a signal inputted through the right I/F unit 211, and outputs the imaging data to the right I/F unit 211. The DP illuminance sensor 65 receives the outside light and outputs a detected value corresponding to the amount of the received light or the intensity of the received light. The LED indicator 67 lights up in accordance with a control signal or a driving current inputted through the right I/F unit 211.

The temperature sensor 217 detects a temperature of the OLED unit 221, and outputs a voltage value or a resistance value corresponding to the detected temperature as a detected value.

The distance sensor 64 outputs a signal indicating a detection result obtained by detecting a distance, to the connection device 10 through the right I/F unit 211.

The reception unit 213 receives video data for display transmitted from the connection device 10 through the right I/F unit 211, and outputs the video data to the OLED unit 221. The OLED unit 221 displays a video based on the video data transmitted by the connection device 10.

The reception unit 233 receives video data for display transmitted from the connection device 10 through the left I/F unit 231, and outputs the video data to the OLED unit 241. The OLED units 221 and 241 each display a video based on the video data transmitted by the connection device 10.

The DP six-axis sensor 235 is a motion sensor including a three-axis acceleration sensor and a three-axis gyro sensor. For example, the DP magnetic sensor 237 is a three-axis geomagnetic sensor. The DP six-axis sensor 235 and the DP magnetic sensor 237 may be an IMU obtained by making each of the sensors described above into a module, or may be a module obtained by integrating the DP six-axis sensor 235 and the DP magnetic sensor 237 into one unit. The IMU stands for an inertial measurement unit. The temperature sensor 239 detects a temperature of the OLED unit 241. The DP six-axis sensor 235, the DP magnetic sensor 237, and the temperature sensor 239 each output a detected value to the connection device 10.

Each component of the image display unit 20 operates with electric power supplied from the connection device 10 through the coupling cable 40. The image display unit 20 includes a power supply unit 229 at the right display unit 22, and also includes a power supply unit 249 at the left display unit 24. The power supply unit 229 distributes and supplies electric power supplied by the connection device 10 through the coupling cable 40, to each component of the right display unit 22 including the right display unit substrate 210. The power supply unit 249 distributes and supplies electric power supplied by the connection device 10 through the coupling cable 40, to each component of the left display unit 24 including the left display unit substrate 230. The power supply units 229 and 249 may include a conversion circuit or the like that converts voltage.

The connection device 10 includes an I/F unit 110, the DP control unit 120, a sensor control unit 122, a display control unit 124, a power-supply control unit 126, a non-volatile storage unit 130, an operating unit 140, a coupling unit 145, and a sound processing unit 147.

The I/F unit 110 includes a connector 11D, and an interface circuit that executes communication protocols conforming to various types of communication standards in connection with the connector 11D. The I/F unit 110 may be, for example, an interface substrate on which the connector 11D and the interface circuit are mounted. The I/F unit 110 may include an interface for a memory card or the like that can be coupled to an external storage device or storage medium. Alternatively, the I/F unit 110 may include a radio communication interface.

The DP control unit 120 includes a processor such as a CPU or a microcomputer. This processor executes a program to control each component of the connection device 10. The DP control unit 120 may include a RAM that constitutes a work area of the processor. The RAM stands for a random access memory.

The non-volatile storage unit 130, the operating unit 140, the coupling unit 145, and the sound processing unit 147 are coupled to the DP control unit 120. The non-volatile storage unit 130 includes a ROM that holds, in a non-volatile manner, a program to be executed by the DP control unit 120 or data. The ROM stands for a read only memory.

The sensor control unit 122 causes each of the sensors of the image display unit 20 to operate. Here, each of the sensors represents the DP outside camera 61, the distance sensor 64, the DP illuminance sensor 65, the temperature sensor 217, the DP six-axis sensor 235, the DP magnetic sensor 237, and the temperature sensor 239. Each of the sensors includes at least any one or more of the DP outside camera 61, the DP illuminance sensor 65, the DP six-axis sensor 235, or the DP magnetic sensor 237. The sensor control unit 122 sets and initializes a sampling period of each of the sensors in accordance with control of the DP control unit 120, and executes energization to each of the sensors, transmission of control data, acquisition of detected values, and the like at the sampling period of each of the sensors.

The sensor control unit 122 outputs detected data indicating the detected value and the detection result of each of the sensors, to the I/F unit 110 at a predetermined timing. Here, the imaging data of the DP outside camera 61 is referred to as detected data as with the detected values or detection result of the other sensors.

The sensor control unit 122 may include an A/D converter that converts an analog signal into digital data. In this case, the sensor control unit 122 converts an analog signal of a detected value or a detection result acquired from a sensor of the image display unit 20 into detected data, and outputs it. The sensor control unit 122 may acquire digital data on a detected value or a detection result from a sensor of the image display unit 20 to perform conversion of a data format or adjustment of output timing or the like, and output the detected data to the I/F unit 110.

Operation of the sensor control unit 122 enables the control device 300 coupled to the I/F unit 110 to acquire a detected value of each of the sensors of the HMD 100 or imaging data on the DP outside camera 61.

The sensor control unit 122 may output a result of computation processing based on a detected value of each of the sensors described above, as detected data. For example, the sensor control unit 122 may integrally process a detected value or detection result of plural sensors to function as a so-called sensor fusion processing unit. In this case, the sensor control unit 122 may generate, through sensor fusion, detected data of a virtual sensor that is not included in each of the sensors of the image display unit 20. For example, the sensor control unit 122 may output, as detected data, trajectory data indicating the trajectory in which the image display unit 20 moves, coordinate data indicating a position of the image display unit 20 in a three-dimensional space, and directional data indicating a direction of the image display unit 20. Here, the coordinate data may be data indicating relative coordinates with respect to the position of the connection device 10, or may be data indicating a position with respect to a reference position set in a space in which the image display unit 20 is present. The directional data may be data indicating a direction based on a position or a direction of the connection device 10, or may be data indicating a direction with respect to a reference position set in a space in which the image display unit 20 is present.

The sensor control unit 122 executes a communication protocol with a device coupled to the connector 11D through the USB cable 46, and outputs detected data.

The display control unit 124 executes various types of processing for causing the image display unit 20 to display an image on the basis of video data or display data inputted into the I/F unit 110. In the present embodiment, the video data is transmitted through the connector 11D configured with a USB Type-C connector in an alternate mode of the USB Type-C. For example, the display control unit 124 executes various types of processing such as cutting-out of a frame, resolution conversion, scaling, intermediate frame generation, or frame rate conversion. The display control unit 124 outputs video data corresponding to each of the OLED units 221 and 241 to the coupling unit 145. The video data inputted into the coupling unit 145 is transmitted as a video signal 201 from the connector 11A to the right I/F unit 211 and the left I/F unit 231. The display control unit 124 adjusts and changes a display state of the image display unit 20 in accordance with the display control data inputted into the I/F unit 110.

The sensor control unit 122 and/or the display control unit 124 may be achieved with a program being executed by a processor to make cooperation of software and hardware. In other words, the sensor control unit 122 and the display control unit 124 are configured with a processor, and a program is executed to execute the operation described above. In this example, the sensor control unit 122 and the display control unit 124 may be achieved with a program being executed by the processor that constitutes the DP control unit 120. In other words, a program may be executed by a processor to achieve functions of the DP control unit 120, the display control unit 124, and the sensor control unit 122. Here, the processor can be paraphrased as a computer. The sensor control unit 122 and the display control unit 124 may include a work memory used to execute data processing, and processing may be executed by using a memory of the DP control unit 120.

The display control unit 124 and the sensor control unit 122 may be configured with programmed hardware such as a DSP or an FPGA. The sensor control unit 122 and the display control unit 124 may be integrated to be configured as an SoC-FPGA. The DSP stands for a digital signal processor. The FPGA stands for a field programmable gate array. The SoC stands for a system-on-a-chip.

The power-supply control unit 126 is coupled to the connector 11D, and is a circuit used to supply electric power to each of the components of the connection device 10 and the image display unit 20 on the basis of power supplied from the connector 11D.

The operating unit 140 detects operation of a switch or the like of the connection device 10 to output data indicating details of the operation to the DP control unit 120.

The sound processing unit 147 generate an audio signal in accordance with audio data inputted from the DP control unit 120 to output it to the coupling unit 145. This sound signal is outputted from the coupling unit 145 to the right earphone 32 and the left earphone 34 through the audio connector 36. The sound processing unit 147 generates audio data on the sound collected by the microphone 63 to output it to the DP control unit 120. The audio data outputted by the sound processing unit 147 may be processed by the sensor control unit 122 as with the detected data of a sensor of the image display unit 20.

4. Configuration of Control Device

Figure 4:
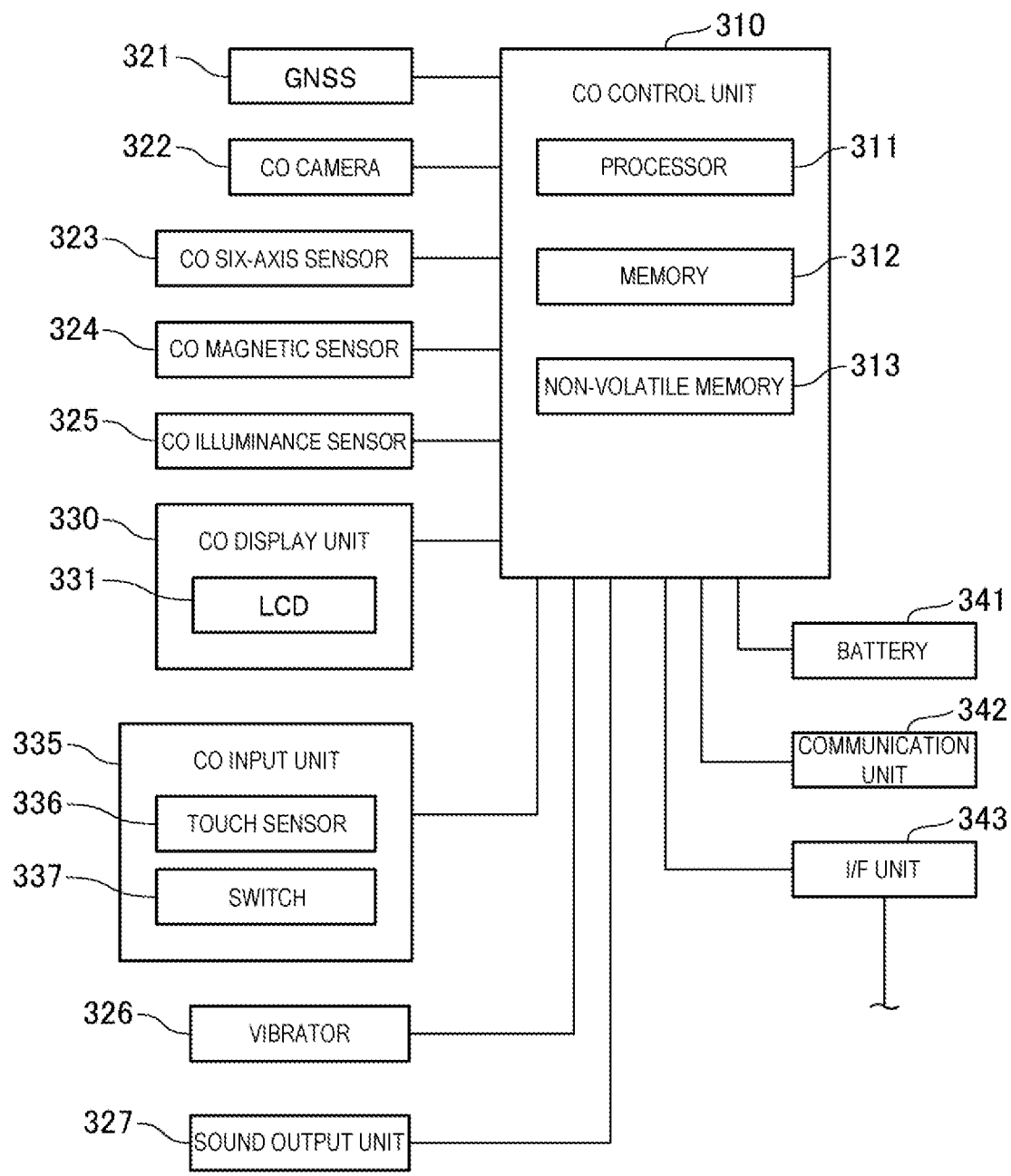
FIG. 4 is a block diagram illustrating a control device.

FIG. 4 is a block diagram illustrating the control device 300.

The control device 300 includes a CO control unit 310. The CO control unit 310 includes a processor 311, a memory 312, and a non-volatile memory 313. The processor 311 includes a CPU, a microcomputer, a DSP, and the like, and executes a program to control each of the components of the control device 300. The memory 312 constitutes a work area of the processor 311. The non-volatile memory 313 includes a semiconductor memory device or the like, and holds, in a non-volatile manner, programs to be executed by the processor 311 and various types of data to be processed by the processor 311. For example, the non-volatile memory 313 holds an operating system serving as a basic control program to be executed by the processor 311, application programs operating on the operating system, and the like. The non-volatile memory 313 holds data to be processed at the time of execution of the application program, and also holds data on processing results. Below, the operating system is referred to as an OS.

The CO control unit 310 may be an SoC obtained by integrating the processor 311, the memory 312, and the non-volatile memory 313.

A GNSS 321, a CO camera 322, a CO six-axis sensor 323, a CO magnetic sensor 324, a CO illuminance sensor 325, a vibrator 326, a sound output unit 327, a CO display unit 330, and a CO input unit 335 are coupled to the CO control unit 310.

The GNSS 321 uses a satellite positioning system to perform positioning, and outputs the position of the control device 300 to the CO control unit 310. The GNSS stands for a global navigation satellite system.

The CO camera 322 is a digital camera provided at the main body of the control device 300, and is disposed, for example, adjacent to the touch panel 350. The CO camera 322 images the direction in which the touch panel 350 faces. The CO camera 322 performs imaging in accordance with control by the CO control unit 310 to output imaging data to the CO control unit 310.

The CO six-axis sensor 323 is a motion sensor including a three-axis acceleration sensor and a three-axis gyro sensor, and outputs detected data indicating a detected value to the CO control unit 310. The CO magnetic sensor 324 is, for example, a three-axis magnetic field sensor, and outputs detected data indicating a detected value to the CO control unit 310. The CO six-axis sensor 323 and the CO magnetic sensor 324 may be an IMU obtained by making each of the sensors described above into a module, or may be a module obtained by integrating the CO six-axis sensor 323 and the CO magnetic sensor 324 into one unit.

The CO illuminance sensor 325 receives the outside light to output detected data indicating a detected value corresponding to the amount of the received light or the intensity of the received light, to the CO control unit 310.

The vibrator 326 generates vibration in accordance with control of the CO control unit 310, and causes part of or all of the main body of the control device 300 to vibrate. The vibrator 326 is configured, for example, to include an eccentric weight and a motor. The vibrator 326 corresponds to an example of a vibration generating unit. The control device 300 may have a configuration in which a piezoelectric vibration unit that utilizes a piezoelectric element is provided, in place of the vibrator 326 or in addition to the vibrator 326. In this case, vibration may be generated by the piezoelectric vibration unit in accordance with control of the CO control unit 310.

The sound output unit 327 includes a speaker to output a sound from the speaker in accordance with control of the CO control unit 310. The sound output unit 327 may include an amplifier that amplifies the audio signal outputted by the CO control unit 310 to output it to the speaker. When the CO control unit 310 is configured to output digital audio data, the sound output unit 327 may include a D/A converter that converts digital audio data to an analog audio signal. Alternatively, the control device 300 may be configured to have a piezoelectric buzzer, in place of the sound output unit 327 or in addition to the sound output unit 327. In this case, the sound may be outputted by the piezoelectric buzzer in accordance with control of the CO control unit 310.

The CO display unit 330 includes an LCD 331 to display characters and images on the LCD 331 in accordance with control of the CO control unit 310.

The CO input unit 335 detects operation performed to the touch sensor 336 and the switch 337 to output operation data indicating the detected operation to the CO control unit 310. The touch sensor 336 is superimposed on the surface of the LCD 331, and constitutes the touch panel 350 together with the LCD 331. The touch sensor 336 detects a contact operation and a pressing operation performed by the user U. For example, the switch 337 is a hardware switch such as a power-supply switch, a volume adjustment switch, and the like of the control device 300.

A battery 341, a communication unit 342, and an I/F unit 343 are coupled to the CO control unit 310.

The battery 341 is a secondary battery built into the main body of the control device 300, and supplies power to each of the components of the control device 300. The battery 341 may include a control circuit (not illustrated) that controls power output and charging to the secondary battery.

The communication unit 342 corresponds to a wireless communication protocol such as Bluetooth or Wi-Fi, and performs wireless communication with a device outside of the display system 1. The Bluetooth and Wi-Fi are registered trademarks. The communication unit 342 may be configured to perform mobile data communication using a mobile communication network such as LTE or a fifth generation mobile communication system. The LTE is a registered trademark.

The I/F unit 343 includes a connector (not illustrated) that is to be coupled to a data communication cable, and an interface circuit that executes a communication protocol conforming to various types of communication standards using the connector. For example, the I/F unit 343 includes a connector and an interface circuit conforming to the USB standard to send and receive data through the USB cable 46.

In the present embodiment, the control device 300 sends video data to the HMD 100 through the I/F unit 343, and receives detected data of a sensor from the HMD 100. The control device 300 supplies power to the HMD 100 through the I/F unit 343.

The I/F unit 343 according to the present embodiment includes a USB interface, and has a configuration, as one example, in which the control device 300 uses the USB cable 46 coupled to the I/F unit 343 to send and receive data with the HMD 100.

For example, the control device 300 may perform wireless data communication with the HMD 100 by using the communication unit 342.

5. Configuration of Software Platform

Figure 5:
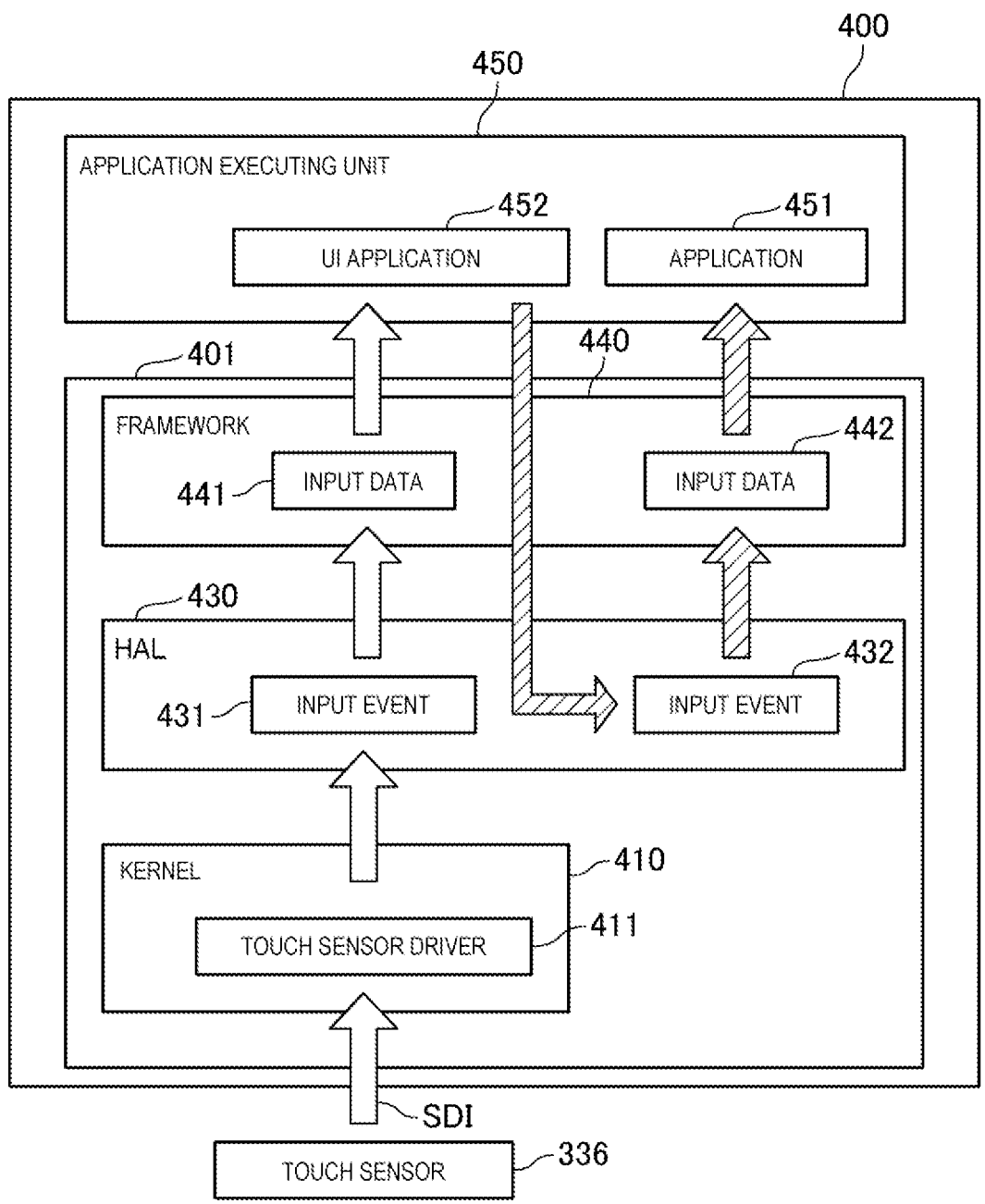
FIG. 5 is a schematic view illustrating a configuration of a software platform of the control device.

FIG. 5 is a schematic view illustrating a configuration of a software platform of the control device 300. The processor 311 executes the operating system to make hardware and software work in a collaborative manner, whereby the control device 300 configures a platform 400 that causes application software to operate.

The operating system executed by the processor 311 is configured with a group of files including an execution file of a program executed by the processor 311, a data file to be processed by the program, and the like. For example, the operating system of the control device 300 includes a general-purpose operating system such as Android, iOS, iPad OS, Windows, Mac OS, Linux, Unix, and Tron. The operating system executed by the processor 311 may be obtained by partially modifying the general purpose operating system described above. Android, iOS, iPad, Windows, Linux, Unix, and Tron are registered trademarks. Mac is a trademark.

The platform 400 is configured to include a number of functional modules. FIG. 5 illustrates a portion of the functional modules of the platform 400. The platform 400 is able to control various types of sensors such as the CO camera 322, the CO six-axis sensor 323, the CO magnetic sensor 324, and the CO illuminance sensor 325, each of which is included in the control device 300, and also control sensors that are included in the HMD 100, and the like. FIG. 5 illustrates a configuration, as one example, in which detected data of the touch sensor 336 is acquired to detect an operation performed to the touch panel 350.

The platform 400 includes a kernel 410, an HAL 430, a framework 440, and an application executing unit 450. The kernel 410, the HAL 430, and the framework 440 are achieved with the function of the operating system executed by the processor 311. The operating system is configured to include one or more programs, data, libraries, runtime modules, and the like. These are executed or processed by the processor 311 to cause the processor 311 to function as the kernel 410, the HAL 430, and the framework 440. The application executing unit 450 is configured with the processor 311 executing the operating system. The application executing unit 450 employs execution environments provided by the platform 400, and has a function of causing the processor 311 to execute the application 451. In other words, the processor 311 forms the main portion of the hardware that constitutes the application executing unit 450. The same applies to the kernel 410, the HAL 430, and the framework 440.

The kernel 410 serves as a functional unit that achieves the basis function of the platform 400. The kernel 410 has a driver that controls the hardware of the control device 300. The driver included in the kernel 410 corresponds to each type of hardware, for example.

As one example, in the platform 400 of Android OS, the kernel 410 is configured with a Linux kernel. The framework 440 corresponds to a Java framework, and may be achieved by using Android runtime modules or native libraries. The Java is a registered trademark.

In the example illustrated in FIG. 5, the kernel 410 includes a touch sensor driver 411 serving as a driver that controls hardware external to the control device 300. The touch sensor driver 411 is a driver that controls the touch sensor 336. The touch sensor driver 411 detects a touch operation or a pressing operation performed to the touch sensor 336 to acquire data indicating an operating position. The kernel 410 corresponds to one example of a detecting unit.

Figure 6:
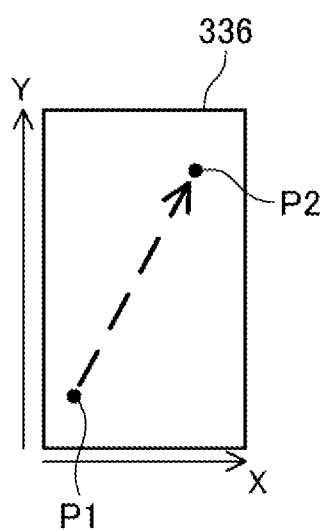
FIG. 6 is a diagram used to describe a method for detecting an operation performed to a touch sensor.

FIG. 6 is a diagram used to describe a method for detecting an operation performed to the touch sensor 336. For example, the touch sensor 336 has a rectangular detection region. In the detection region of the touch sensor 336, for example, an X-Y orthogonal coordinate including the X axis and the Y axis is set as illustrated in FIG. 6. The touch sensor driver 411 acquires a detected signal SD1, which is an analog signal outputted by the touch sensor 336, and generates a detected data SD2 including the X coordinate and the Y coordinate of the position at which the operation has been performed in the detection region of the touch sensor 336. The touch sensor 336 may be a sensor unit that includes peripheral circuitry that generates digital data. In this case, the touch sensor 336 does not output the detected signal SD1, and outputs the detected data SD2 including the X coordinate and the Y coordinate of the operating position. The touch sensor driver 411 acquires the detected data SD2 outputted by the touch sensor 336.

A sensor-data providing unit 401 outputs the operating position of the touch sensor 336 in two modes, that is, the absolute coordinate and the relative coordinate. The absolute coordinate provides a mode in which the X coordinate and the Y coordinate of the operating position are provided to the application executing unit 450 as data on the operating position. For example, when the contact position moves from the position P1 to the position P2 as illustrated in FIG. 6, the X coordinate and the Y coordinate of each position from the position P1 to the position P2 are output as the absolute coordinate. On the other hand, the relative coordinates provides a mode in which relative positional relationship of plural operating positions detected by the touch sensor 336 is outputted. In the example illustrated in FIG. 6, the difference between the coordinates of the position P2 and the position P1, or the direction and the distance from the position P1 to the position P2 is output.

The touch sensor driver 411 performs a process of acquiring an operating position of the touch sensor 336 at each detection timing in a predetermined sampling cycle. The touch sensor driver 411 acquires a coordinate of the operating position on the touch sensor 336 at the detection timing. Thus, the detected signal SD1 or the detected data outputted in place of the detected signal SD1 indicates the X coordinate and the Y coordinate, which are absolute coordinates of the operating position.

The HAL 430 and the framework 440 function to pass data processed by the kernel 410 to the application executing unit 450. The HAL stands for a hardware abstraction layer.

The HAL 430 inputs and outputs data related to hardware control to and from the kernel 410. The HAL 430 requests the kernel 410 to control hardware, and obtains data acquired by the kernel 410. FIG. 5 illustrates an example of the input event 431 that the HAL 430 has. The input event 431 is an event informed by the kernel 410 to the HAL 430 every time the touch sensor driver 411 acquires the detected signal SD1 on the touch sensor 336. The input event 431 includes detected data acquired by the touch sensor driver 411. The HAL 430 corresponds to one example of an event informing unit.

In the present embodiment, the HAL 430 operates at a layer higher than the kernel 410 as illustrated in FIG. 5. However, a different configuration may be taken depending on specifications of the operating system, provided that the function of the sensor-data providing unit 401 with respect to the application executing unit 450 is the same. For example, the HAL 430 may be implemented as middleware operating between hardware and the kernel 410. In this case, the HAL 430 controls hardware and passes the detected data acquired from the hardware to the kernel 410.

The framework 440 holds the detected data on the input event 431 as input data 441. The input data 441 is detected data acquired by the touch sensor driver 411 from the touch sensor 336 or data obtained by processing this detected data. In the present embodiment, the input data 441 includes coordinate data on absolute coordinates of the operating position of the touch sensor 336.

In the platform 400, the kernel 410, the HAL 430, and the framework 440 function as the sensor-data providing unit 401 that provides the application 451 with input data 441 and input data 442 to be described later. It is only necessary that the sensor-data providing unit 401 is able to provide the input data 441 and 442 to the application executing unit 450, and the architecture illustrated in the figure is an example. The input data 441 and 442 each correspond to an example of the detected data.

The application executing unit 450 executes an application program installed on the control device 300. FIG. 5 illustrates the application 451 and a UI application 452 as examples of the application. The UI stands for a user interface.

There is no limitation as to the number of and types of applications executed by the application executing unit 450. For example, the application executing unit 450 may execute an application in which the control device 300 achieves functions such as a calendar, clock, alarm, calculator, phone call, messaging, email, camera capture, photo management, or the like, as basic functions.

The application 451 is an application for performing processing on the basis of the operating position with respect to the touch sensor 336. For example, the application 451 achieves a function of displaying characters and images by using the image display unit 20. In this case, the CO control unit 310 executes the application 451 to generate display data for causing the image display unit 20 to display, and outputs it to the HMD 100 using the I/F unit 343. The CO control unit 310 executes the application 451 to generate display control data for controlling the display of the image display unit 20, and outputs it to the HMD 100 using the I/F unit 343. The display data may be video data or motion picture data, and is, for example, video data in a format of HDMI. The display data may be still image data, or may be a character or symbol data. The display control data is, for example, control data configured to set the display brightness and contrast of the image display unit 20.

The HMD 100 displays an image, video, or a character on the image display unit 20 on the basis of the display data outputted by the control device 300.

The HMD 100 adjusts and changes the display state of the image display unit 20 in accordance with the display control data outputted by the control device 300.

In addition to the touch sensor driver 411, the kernel 410 can operate a driver that acquires detected data on various types of sensors. These drivers each inform the HAL 430 of an event. The timing at which events are informed by the individual drivers is not restricted to the timing of operation of the touch sensor driver 411. For example, it is possible to perform these information in parallel. Similarly, there is no limitation as to the number of the events informed to the HAL 430. In addition, the number of or types of data held by the framework 440 is not limited.

The input data 441 and 442 are provided to the application executing unit 450 as described above. The application executing unit 450 is able to request both the input data 441 and 442 from the framework 440, and in response to this request, the input data 441 or the input data 442 is provided. Applications that operate on the application executing unit 450 may look up the input data 441 and 442.

For example, it is assumed that the application 451 uses data on relative coordinates concerning operation on the touch sensor 336, and data on operations specific to a graphical user interface displayed on the touch panel 350. The platform 400 according to the present embodiment has a function of providing the application 451 with various types of input data generated on the basis of detected data acquired by the touch sensor drive 411.

The UI application 452 is an application that constitutes a graphical user interface of the control device 300. An image for input is displayed on the touch panel 350. Input data corresponding to the image for input is generated on the basis of the correspondence between the operating position on the touch panel 350 and the image for input.

More specifically, the UI application 452 is an application that has authority to access the sensor-data providing unit 401, and, for example, functions as a plug-in for the operating system of the control device 300. The UI application 452 has a function of informing the HAL 430 of the input event 432. The input event 432 is an event that includes input data generated by the UI application 452 and indicates an input operation that is different from the coordinates of the touch operation performed to the touch sensor 336.

The UI application 452 gives information regarding the input event 432, whereby the input data 442 based on the input event 432 is passed to the framework 440 from the HAL 430. The input data 442 is data on an input operation corresponding to the input event 432. This allows the input data 442 to be provided from the framework 440 to the application 451.

The input data 442 may be data with respect to an absolute coordinate based on the X axis and the Y axis. For example, it may be possible to set the input data 442 as data with respect to a coordinate based on the X axis and the Y axis, which are coordinate axes in directions different from the input data 441.

The orientation of the control device 300 when the user U holds the control device 300 with its hand is not limited to the basic position. Thus, the CO control unit 310 may use the detected data of the CO six-axis sensor 323 and the CO magnetic sensor 324 to determine the orientation of the control device 300, and rotate the display of the LCD 331 so as to correspond to the orientation of the control device 300. In this case, the CO control unit 310 changes the apparent X coordinate and the apparent Y coordinate of the touch sensor 336 in accordance with the orientation of the control device 300.

Figure 7:
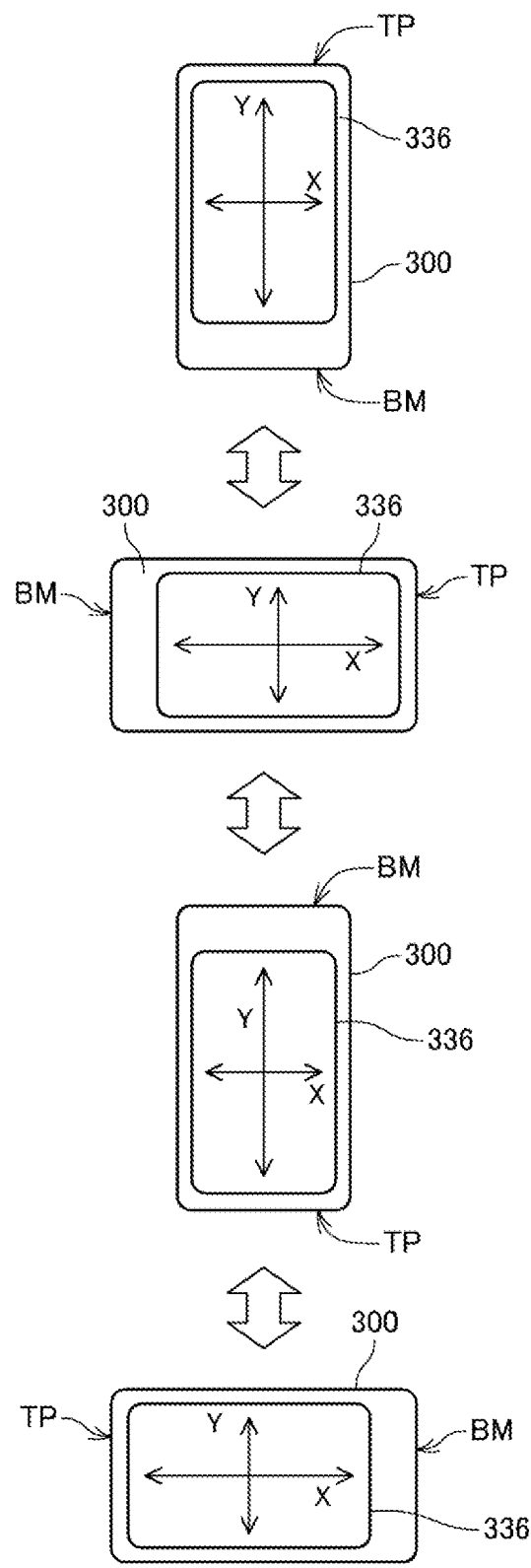
FIG. 7 is a schematic view illustrating an example of a correspondence between orientations of the control device and detected directions of operation.

FIG. 7 is a schematic view illustrating an example of a correspondence between the orientations of the control device 300 and the detected directions of operation. In FIG. 7, the reference sign TP represents the upper end of the control device 300 at the basic position, and the reference sign BM represents the lower end.

The UI application 452 determines the orientation of the control device 300 on the basis of the detected data of the CO six-axis sensor 323 and the CO magnetic sensor 324, and changes the display direction of the LCD 331 and the X and Y axes of the detected coordinates of the touch sensor 336 by a 90 degree step. For example, as illustrated in FIG. 7, when the control device 300 rotates so that the upper end TP is at each of the upper, right, lower, and left positions, the Y axis rotates so as to align with an actual top-bottom direction, in other words, align with the vertical direction.

The X axis and the Y axis direction of the touch sensor 336 are set in a manner fixed to the hardware. Thus, processing is performed to convert the X axis and the Y axis of the detected coordinates of the touch sensor 336 in accordance with the orientation of the control device 300. This processing is performed, for example, by the UI application 452.

The UI application 452 acquires the detected data of the CO six-axis sensor 323 and the CO magnetic sensor 324 to determine the orientation of the control device 300. The UI application 452 converts the input data 441 in accordance with the orientation of the control device 300 to generate the input data 442 in the absolute coordinate based on the changed X-axis and Y-axis directions. As described above, the application of the UI application 452 is not limited to applications in which data in the absolute coordinate is converted into other types of data. For example, it is possible to use the UI application 452 in a process of converting the coordinate axis, the process being applied to the input data 441 in the absolute coordinate provided by the sensor-data providing unit 401.

The type of and details of the input data 442 vary depending on the user interface executed by the UI application 452. A user interface achieved by the UI application 452 on the control device 300 will be described below.

6. Display Mode of Display System

FIGS. 8, 9, 10, 11, and 12 are schematic diagrams each illustrating an example of a display mode of the display system 1.

In FIGS. 8, 9, 10, and 12, the display of the image display unit 20 and the display of the control device 300 are illustrated so as to correspond to each other. The right display unit 22 and the left display unit 24 each display an image. Thus, it can be said that the image display unit 20 is configured to display two images. The image display unit 20, however, operates so that the user U recognizes one image. For this reason, in each of the drawings, the image display unit 20 is illustrated as one display unit 205, and an image that the image display unit 20 causes the user U to visually recognize is illustrated as one rectangular image. The various types of screens and display objects displayed on the display unit 205 are displayed in accordance with the display data outputted by the control device 300 to the HMD 100. Thus, the display mode of the display system 1 is achieved by the control of the control device 300. The image display unit 20 and the display unit 205 correspond to an example of the first display unit. The LCD 331 and the touch panel 350 correspond to an example of the second display unit.

Figure 8:
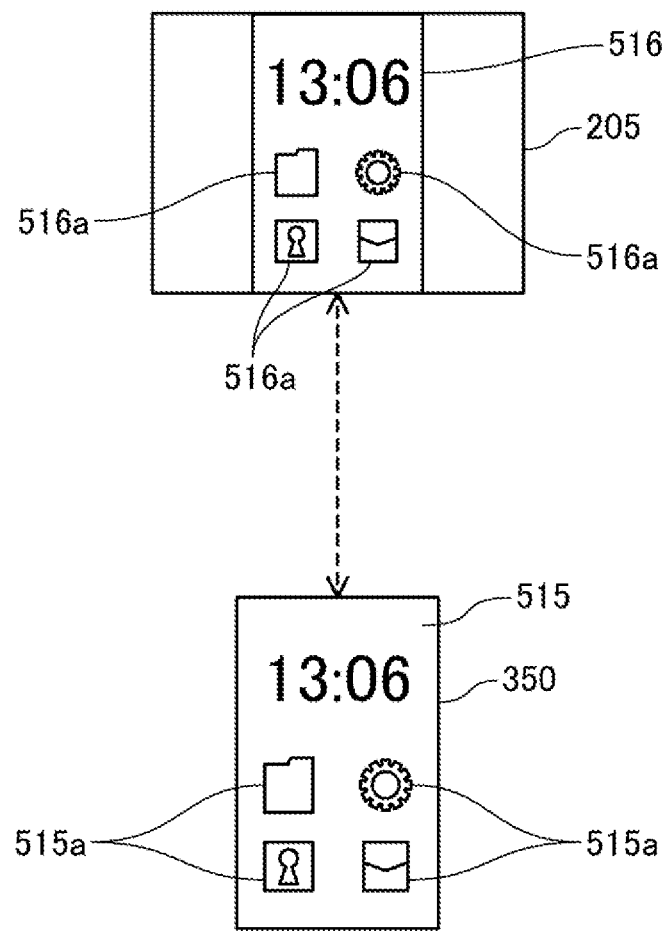
FIG. 8 is a schematic view illustrating an example of a display mode of the display system.

FIG. 8 illustrates a mirroring mode as an example of the display mode of the display system 1. The mirroring mode is a display mode in which the control device 300 and the image display unit 20 display the same image. FIG. 8 illustrates an example in which home screens 515 and 516 are displayed in the mirroring mode. The home screen 515 is a screen displayed in a basic state of operation of the control device 300. Objects 515a to be operated are disposed on the home screen 515. Each of the objects 515a is an icon that corresponds to each of the applications 451 installed on the control device 300. When a touch operation is performed on a position of the object 515a, the application 451 corresponding to this object 515a is executed.

For example, the application 451 for the home screen provides the function of displaying the home screen 515 and the function of activating the application 451 in response to operation performed to the object 515a.

In the mirroring mode, the control device 300 generates display data used to display a screen common to the screen displayed on the touch panel 350, and outputs it to the HMD 100. In the mirroring mode illustrated in FIG. 8, the home screen 515 is displayed on the touch panel 350, and the home screen 516, which is the same as the home screen 515, is displayed on the display unit 205. Although the aspect ratio is different between the touch panel 350 and the display unit 205, the home screen 516 in the mirroring mode is displayed on the display unit 205 at the same aspect ratio as the touch panel 350. The resolution of the home screen 515 and the resolution of the home screen 516 may not be completely the same.

An object 516a common to the object 515a of the home screen 515 is disposed on the home screen 516.

In the mirroring mode, the sensor-data providing unit 401 provides input data 442 indicating the relationship between the operating position on the touch panel 350 and the operating position of the object 515a. For example, when the operating position overlaps with any of the objects 515a, the input data 442 indicating the operation performed to this object 515a is generated by the UI application 452. In this case, the input data 442 is data for identifying the object 515a that has been operated. The input data 442 may include data indicating a mode of operation performed to the object 515a. The mode of operation includes a single contact, a plurality of consecutive contacts, a contact made for a longer time than a reference, a pressing operation with a pressure exceeding a reference force, or the like.

The application 451 that displays the home screen 515 may use input data 441 indicating the absolute position of the operating position on the touch panel 350 to detect an operation performed to the object 515a.

When the application 451 that displays the home screen 515 corresponds to the input data 442, the application 451 can look up the input data 442 to easily identify the object 515a that has been operated. This enables activation or the like of the application 451 corresponding to the object 515a that has been operated.

Figure 9:
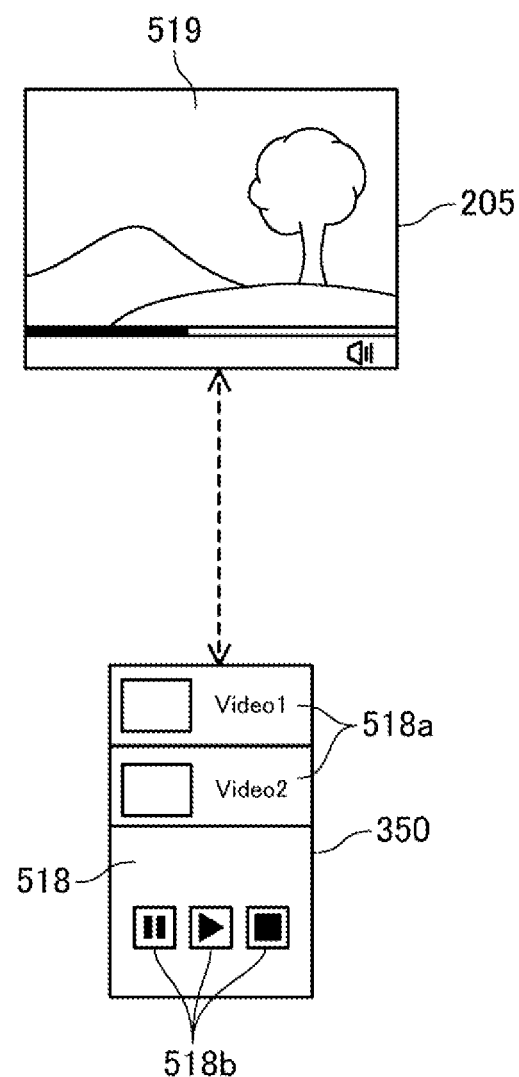
FIG. 9 is a schematic view illustrating an example of a display mode of the display system.

As one example of the display mode of the display system 1, FIG. 9 illustrates an expansion screen mode in which the display unit 205 and the touch panel 350 display differently. The expansion screen mode is a display mode in which, in addition to the display unit 205, the touch panel 350 is used as a supplementary display region to use a large display region with the expanded display unit 205. In the expansion screen mode, the display unit 205 and the touch panel 350 display differently. For example, the display unit 205 serves as a main display region, and the touch panel 350 serves as a supplementary display region.

In the example illustrated in FIG. 9, the control device 300 executes an application 451 for playing a motion picture. With the function of the application 451 for playing a motion picture, the control device 300 causes an operation screen 518 for performing an operation of playing a motion picture to be displayed on the touch panel 350, and also causes a playback screen 519 for displaying a motion picture to be displayed on the display unit 205. In the operation screen 518, a motion-picture list 518a and an operation object 518b are arranged. The motion-picture list 518a shows a list of motion pictures to be played, allowing operation of selecting a motion picture. The operation object 518b is used to give an instruction of playing, stopping, posing, or the like of a motion picture. On the other hand, an indicator indicating a motion picture in playback and the position in playback or the sound volume is disposed in the playback screen 519. During display of the operation screen 518, the input data 442 is provided in response to operation performed to the touch panel 350, the input data 442 being based on the operating position and the display position on the motion-picture list 518a or the operation object 518b.

In the example illustrated in FIG. 9, the application 451 for playing a motion picture may use the input data 441 indicating the absolute position of the operating position on the touch panel 350 to detect an operation performed to the motion-picture list 518a or the operation object 518b.

When the application 451 for playing a motion picture corresponds to the input data 442, the application 451 looks up the input data 442 to easily identify the motion-picture list 518a or the operation object 518b that has been operated. Thus, it is possible to execute operation of playing a motion picture in response to the operation.

Figure 10:
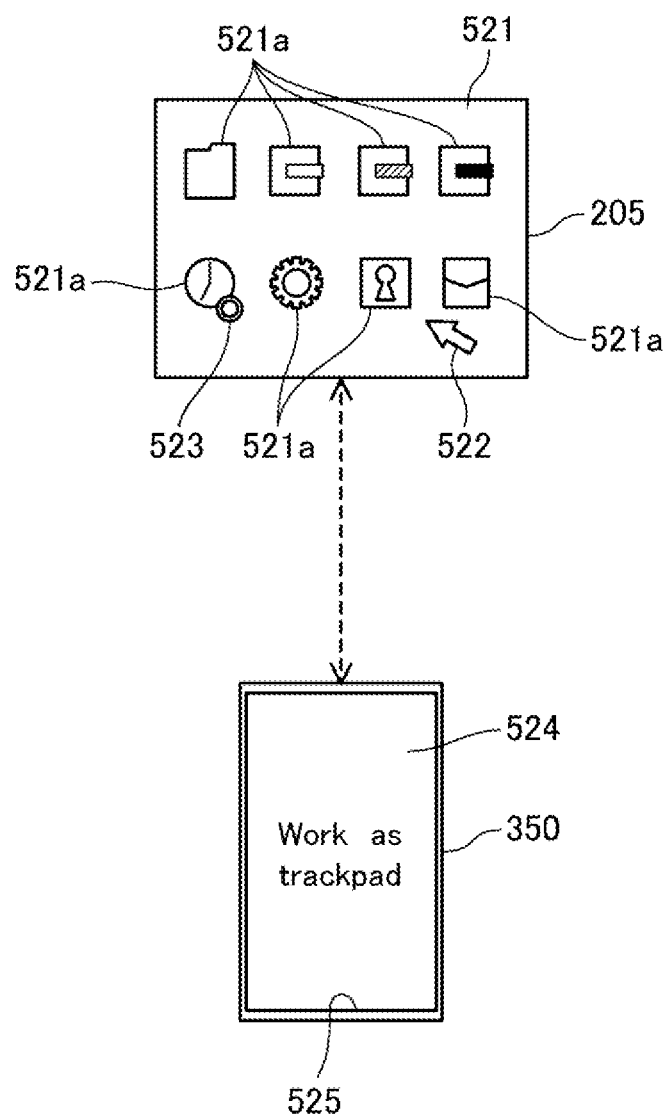
FIG. 10 is a schematic view illustrating an example of a display mode of the display system.

FIG. 10 illustrates a trackpad mode as an example of the display mode of the display system 1. In the trackpad mode, the touch panel 350 functions as an input device used to perform a contact operation.

In the trackpad mode, a trackpad screen 524 is displayed on the LCD 331. The trackpad screen 524 may be a screen that includes no displayed objects and looks like a non-displayed state. In addition, for example, with the LCD 331, the trackpad screen 524 may also include a guide 525 as illustrated in FIG. 10 to display, to the user U, a detection region where the touch panel 350 detects an operation as a trackpad. Furthermore, the trackpad screen 524 may also include a character string indicating that the touch panel 350 functions as a trackpad, as illustrated in FIG. 10.

In the trackpad mode, the user U uses the touch panel 350 to operate on the home screen 521 displayed on the display unit 205. An object 521*a* such as an icon corresponding to the application 451 is disposed on the home screen 521. A pointer 522 or a cursor 523 indicating the operating position on the touch panel 350 is displayed on the home screen 521. The user U operates the touch panel 350 while viewing the pointer 522 and the cursor 523.

In the trackpad mode, the application 451 that displays the home screen 521 may operate by looking up the input data 441 including data on the operating position in the absolute coordinate.

In the trackpad mode, the UI application 452 changes the input data 441 into an operating position on the display unit 205 to generate input data 442. In other words, data obtained by converting the operating position on the touch panel 350 into the operating position on the display unit 205 having different aspect ratios and shapes is provided as the input data 442. In this case, the application 451 can detect the operation performed to the object 521*a* on the basis of the object 521*a* disposed on the display unit 205 and the input data 442.

The input data 442 indicates the operating position that has been converted with the display unit 205 being the reference. This makes it possible to display the pointer 522 and the cursor 523 in accordance with the input data 442.

The trackpad mode can be regarded as a display mode in which the mirroring mode illustrated in FIG. 8 has been modified. For example, the display mode at the time of displaying the home screen may be set in advance in the control device 300. In this case, when an instruction to display the home screen is given, the CO control unit 310 looks up the settings to perform either an operation of displaying the home screens 515 and 516 in the mirroring mode or an operation of displaying the home screen 521 in the trackpad mode.

Figure 11A:
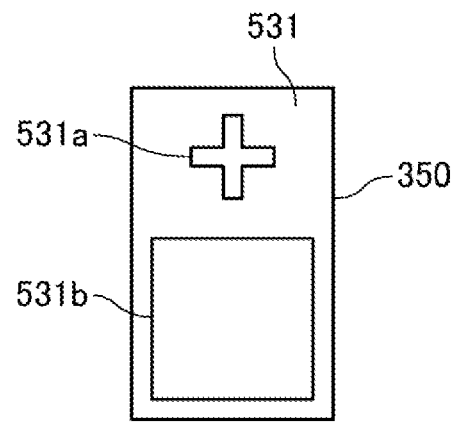
FIGS. 11A to 11C are schematic views each illustrating an example of a display mode of the display system.
Figure 11B:
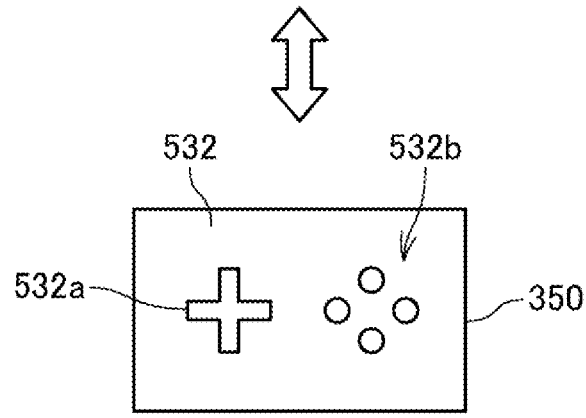
Figure 11C:
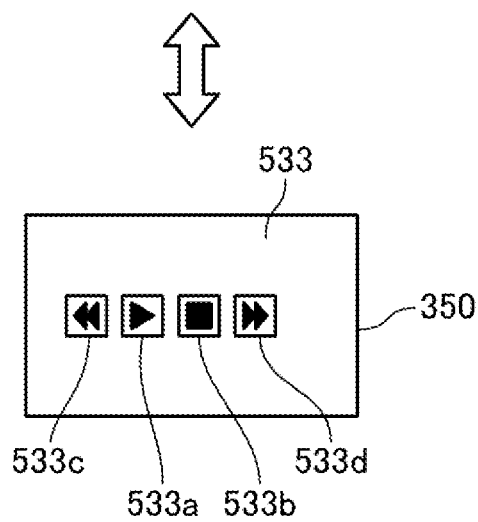

FIGS. 11A to 11C each illustrate a virtual device mode as one example of the display mode of the display system 1. In the virtual device mode, the touch panel 350 is caused to function as an input device such as a so-called game pad. FIGS. 11A to 11C each illustrate an example of display of the touch panel 350 in the virtual device mode. FIG. 11A illustrates an example of display in a first virtual device mode. FIG. 11B illustrates an example of display in a second virtual device mode. FIG. 11C illustrates an example of display in a third virtual device mode.

In the first virtual device mode, an input device screen 531 is displayed on the touch panel 350. An object 531*a* that imitates a directional key and a guide image 531*b* that indicates a region functioning as a trackpad are disposed as a display object on the input device screen 531. The object 531*a* is an image that imitates the shape of a so-called cross key in which keys indicating directions of the top, bottom, left, and right are integrated. The user U performs a touch operation at the position of the object 531*a* to perform operations similar to those performed to a cross key. The user U performs a touch operation within the frame of the guide image 531*b* to perform operations similar to those performed to a trackpad.

At the time of executing the first virtual device mode, the sensor-data providing unit 401 provides the input data 442 indicating an operation performed to the object 531*a* and the guide image 531*b*, on the basis of the input data 441. In this case, the input data 442 includes operation data on the up, down, left, and right directions of the object 531*a*, and data on a coordinate of the operating position in the guide image 531*b*.

The input data 441 is data on the operating position in the absolute coordinate over the entire touch panel 350. The UI application 452 acquires, from the data on the coordinate of the input data 441, the data on the coordinate of the range designated on the input device screen 531, and converts it into data on the coordinate with the display unit 205 being the reference or the entire operation region set in advance being the reference. This enables the input data 442 to be similar to input data obtained by using a hardware input device having the same external appearance as the input device screen 531.

In the second virtual device mode, an input device screen 532 is displayed on the touch panel 350. An object 532*a* that imitates a directional key and an object group 532*b* including plural objects that each imitate a button are disposed on the input device screen 532 as a display object. The object 532*a* is an image that imitates the shape of a cross key as with the object 531*a*. The user U performs a touch operation at the position of the object 532*a* to perform an operation similar to that performed to the cross key. In addition, the user U performs a touch operation at the position of each of the objects of the object group 532*b* to perform a pressing operation similar to that performed to a hardware key.

At the time of executing the second virtual device mode, the sensor-data providing unit 401 provides input data 442 indicating an operation performed to the object 532*a* and the object group 532*b* on the basis of the input data 441. In this case, the input data 442 includes operation data on the up, down, left, and right directions of the object 532*a*, and also includes data indicating an operation performed to each of the objects of the object group 532*b*.

The UI application 452 converts the input data 441 including data in the absolute coordinate in the entire touch panel 350 on the basis of the display positions of the object 532*a* and the object group 532*b* to generate the input data 442. This enables the input data 442 to be similar to input data obtained by using a hardware input device having the same external appearance as the input device screen 532.

In the first virtual device mode and the second virtual device mode, a screen of the application 451 that utilizes cursor operations with the objects 531*a* and 532*a* is displayed on the display unit 205. For example, it is possible to use the application 451 that performs games or makes a drawing. In addition, the home screen 521 may be displayed on the display unit 205 in the first virtual device mode and the second virtual device mode. In this case, it is possible to perform an operation of moving the pointer 522, for example, using the objects 531*a* and 532*a*.

In the third virtual device mode, an input device screen 533 is displayed on the touch panel 350. In the input device screen 533, objects 533*a*, 533*b*, 533*c*, and 533*d* are disposed as display objects. These objects each imitate a key used to perform operations related to playback of audio or video. In the example illustrated FIG. 11C, the object 533*a* imitates a play key, the object 533*b* imitates a stop key, the object 533*c* imitates a rewinding key, and the object 533*d* imitates a forward key. The user U performs a touch operation at the display position of each of the objects 533*a*, 533*b*, 533*c*, and 533*d* to perform an operation similar to that performed to the hardware key. In the third virtual device mode, for example, the playback screen 519 is displayed on the display unit 205.

At the time of executing the third virtual device mode, the sensor-data providing unit 401 provides the input data 442 indicating operations performed to the objects 533a, 533b, 533c, and 533d on the basis of the input data 441. In this case, the input data 442 includes, for example, data indicating operations performed to the playback key, the stop key, the rewinding key, and the forward key.

The UI application 452 converts the input data 441 including data in the absolute coordinate on the entire touch panel 350 on the basis of the display positions of the objects 533a, 533b, 533c, and 533d to generate the input data 442. This enables the input data 442 to be similar to input data obtained by using a hardware input device having the same external appearance as the input device screen 532.

As described above, with the first, second, and third virtual device modes, it is possible to cause the touch panel 350 to function as an alternative to a hardware input device in a virtual manner. Thus, the application 451, which is created on the precondition that a hardware input device is used, can be operated using the touch panel 350.

Figure 12:
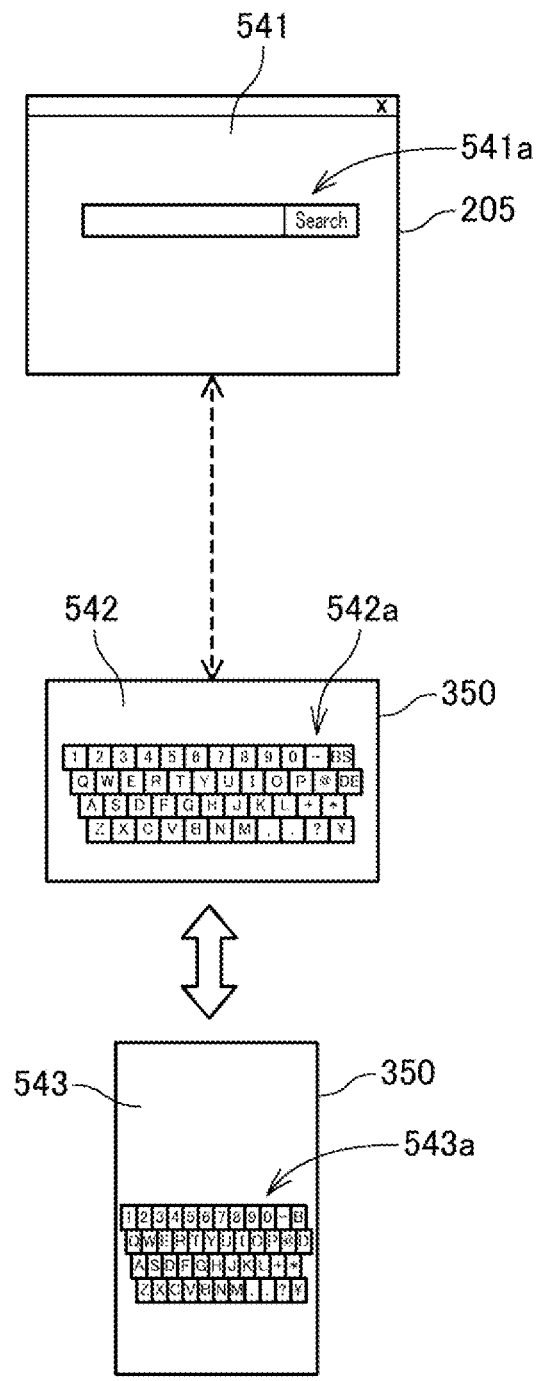
FIG. 12 is a schematic view illustrating an example of a display mode of the display system.

FIG. 12 illustrates a software keyboard mode as one example of the display mode of the display system 1. The software keyboard mode is a display mode used when character input is performed using the touch panel 350.

A character input screen 541 on which a character input portion 541a is disposed is displayed on the display unit 205. The character input screen 541 is displayed, for example, when the application 451 of a web browser accepts input of a search character string or URL.

A keyboard screen 542 on which a software keyboard 542a is disposed is displayed on the touch panel 350. The software keyboard 542a is an image for input. This images imitates a keyboard. When the control device 300 is used in the vertical direction, a keyboard screen 543 can be displayed on the touch panel 350, in place of the keyboard screen 542. The keyboard screen 543 includes a software keyboard 543a corresponding to the touch panel 350 being in a portrait orientation. The software keyboard 543a may be an image having fewer keys than the software keyboard 542a.

In the software keyboard mode, the user U uses the touch panel 350 to perform an operation to the software keyboards 542a and 543a, which allows a character to be inputted in the character input portion 541a.

The UI application 452 changes the input data 441 into an operating position on the software keyboards 542a and 543a to generate the input data 442 that includes a character or symbol that has been operated. In other words, data obtained by converting the operation position on the touch panel 350 into a key that has been operated using the software keyboards 542a and 543a is provided as the input data 442. In this case, the application 451 can perform operation corresponding to the key input.

7. Operation of Control Device

Figure 13:
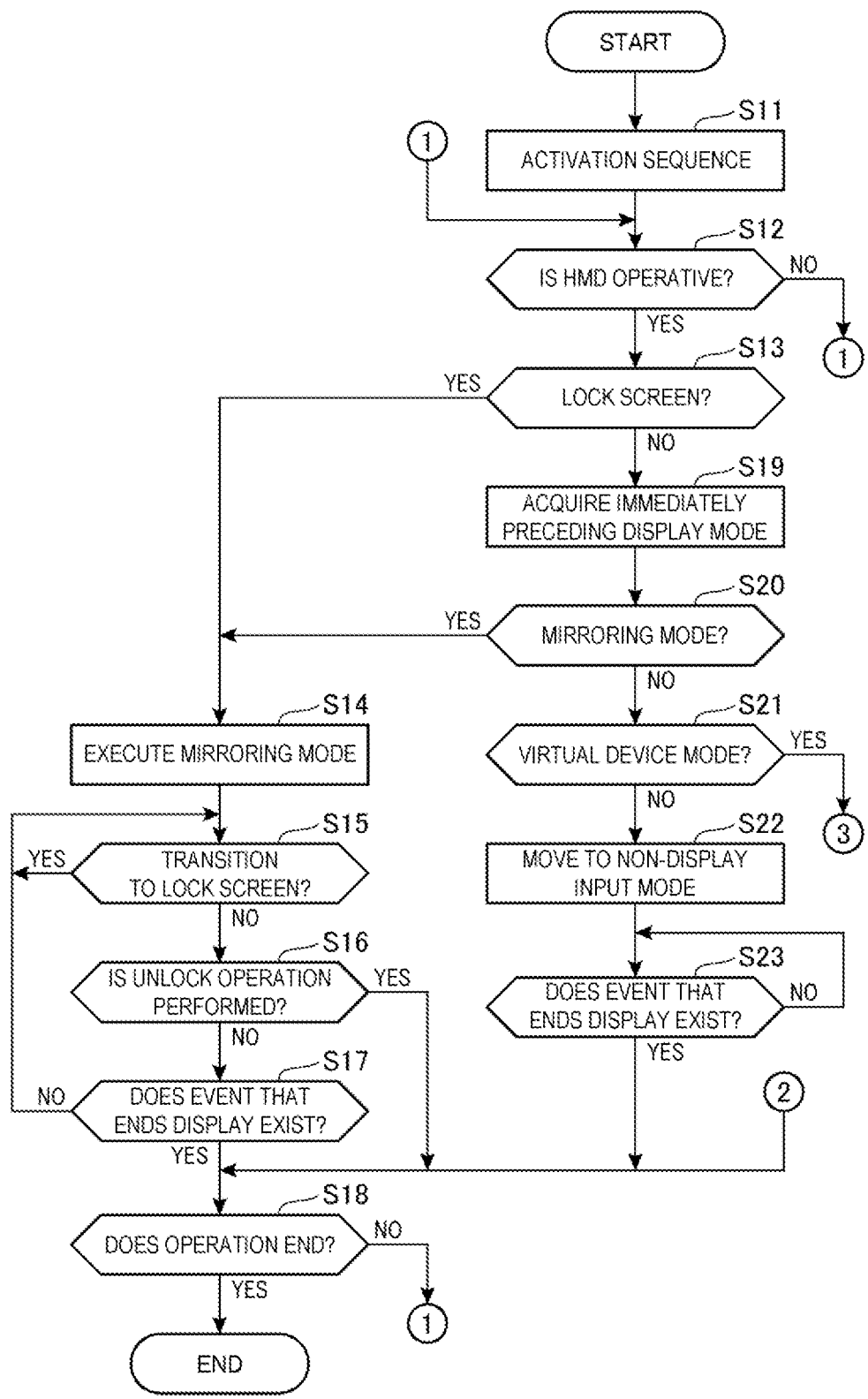
FIG. 13 is a flowchart illustrating an operation of the control device.
Figure 14:
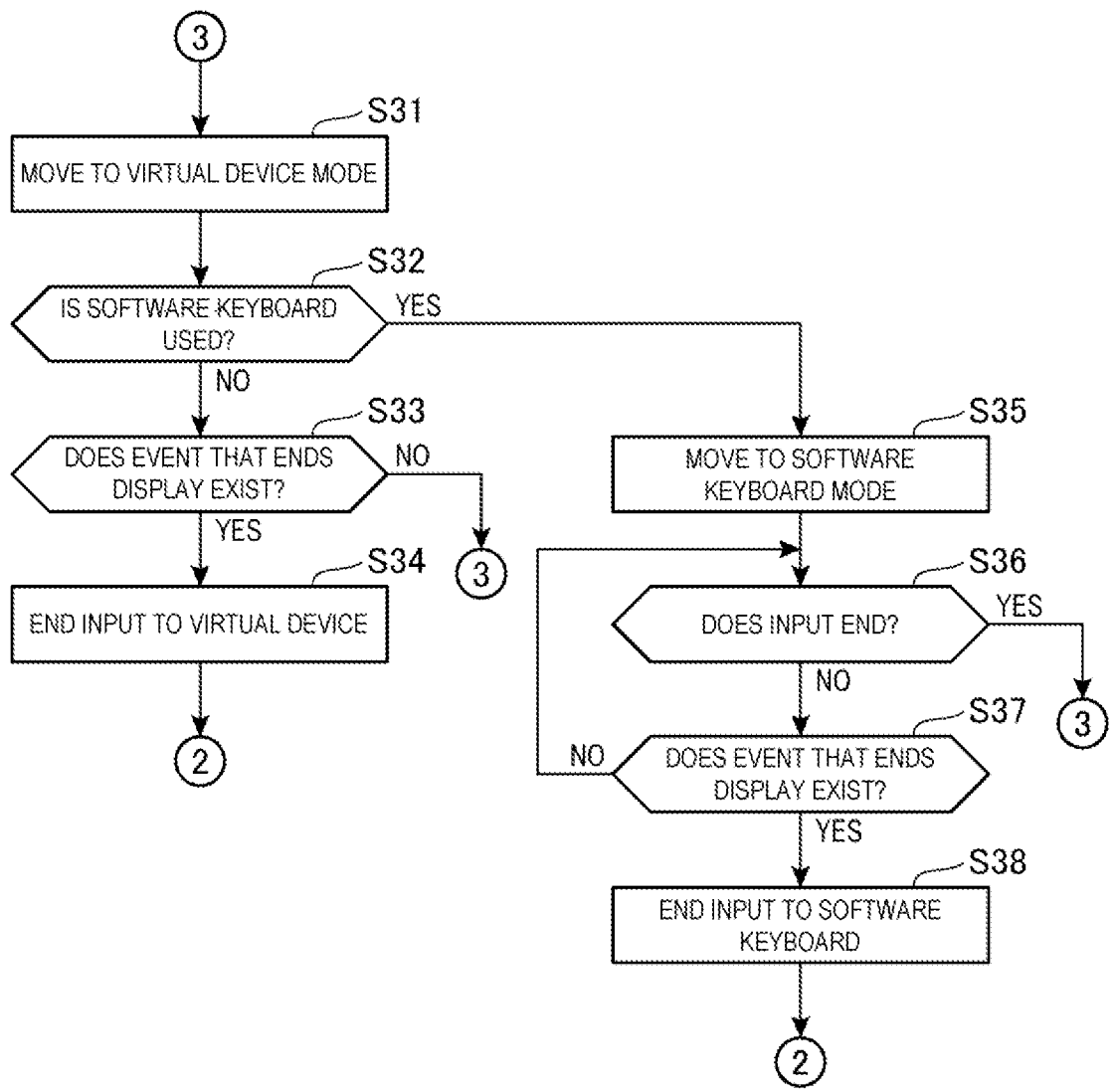
FIG. 14 is a flowchart illustrating an operation of the control device.

FIGS. 13 and 14 are flowcharts each illustrating an operation of the control device 300, and also illustrating an operation related to selection of a display mode of the display system 1.

The CO control unit 310 executes an activation sequence triggered by establishment of an activating condition such as an operation performed to the switch 337 of the control device 300 (step S11). After the activation sequence, the CO control unit 310 determines whether the HMD 100 is operative (step S12). In step S12, determination is made as to whether the control device 300 is coupled to the HMD 100 and the function of controlling the display of the HMD 100 is operative.

The activating condition is not limited to the operation performed to the switch 337. It is only necessary that the activating condition is an operation that the CO control unit 310 can detect. For example, the activating condition may be an operation of moving the main body of the control device 300. In this case, the CO control unit 310 can use the CO six-axis sensor 323 or the CO magnetic sensor 324 to detect movement or displacement of the control device 300, thereby determining a driving condition. As for the activating condition, it is possible to set movement of a body such as an arm or leg of the user U imaged by the CO camera 322 or movement of an indication body such as a device that the user U holds with its hand. In this case, the CO control unit 310 can determine the activating condition on the basis of the captured image by the CO camera 322. In addition, the activating condition may be an operation performed to the operating unit 140, or may be an operation detected by the DP outside camera 61 mounted at the image display unit 20 or by various types of sensors. For example, on the basis of the captured image by the DP outside camera 61, the CO control unit 310 may determine the activating condition including movement of the body of the user U or movement of an indication body such as a device held by the user U with its hand. In addition, it may be possible to use movement of the head of the user U wearing the image display unit 20 as the activating condition. Furthermore, it may be possible to use an operation of patting the image display unit 20 or tapping the image display unit 20 as the activating condition. In this case, the CO control unit 310 can determine the presence or absence of the activating condition on the basis of the detected value of the DP six-axis sensor 235, the DP magnetic sensor 237, or the touch sensor (not illustrated) mounted at the image display unit 20. In other words, it may be possible to employ a configuration in which the image display unit 20 includes a touch sensor and can detect a touch operation performed by the user U, and the touch operation performed to the touch sensor is used as the activating condition. In this case, a condition may be set for a change of or a trajectory of the operating position of the touch operation to use a preset form of the touch operation as the activating condition.

When the display control of the HMD 100 is not operative (step S12; NO), the CO control unit 310 waits at step S12. When the display control of HMD 100 is operative (step S12; YES), the CO control unit 310 determines whether the display system 1 is in a state in which a lock screen is displayed (step S13).

The lock screen is a screen displayed when the HMD 100 and the control device 300 have returned from the non-display state. For example, the lock screen is displayed immediately after the control device 300 is activated or when the display system 1 returns from the power saving state. When an unlock operation set in advance is performed while the lock screen is being displayed, the control device 300 transitions the display from the lock screen to the home screen. The display of the lock screen is maintained during a time when the unlock operation is not performed. For example, the display of the lock screen is maintained even if an operation other than the unlock operation is performed.

The unlock operation may be an operation detected by the CO input unit 335 or an operation detected by the CO camera 322 or various types of sensors. For example, the unlock operation may include an operation of moving the main body of the control device 300. In this case, the CO control unit 310 can detect movement or displacement of the control device 300 using the CO six-axis sensor 323 or CO magnetic sensor 324 to determine the presence or absence of the unlock operation. In addition, the unlock operation may include movement of the body such as the arm or leg of the user U captured by the CO camera 322, or movement of an indication body such as a device held by the user U with its hand. In this case, the CO control unit 310 can determine the presence or absence of the unlock operation on the basis of the captured image by the CO camera 322. Furthermore, the unlock operation may include an operation performed to the operating unit 140, or may include an operation detected by the DP outside camera 61 or various types of sensors mounted at the image display unit 20. Specific examples of the unlock operation include operations of touching in a manner such that a particular trajectory is traced on the touch panel 350. For example, on the basis of the captured image by the DP outside camera 61, the CO control unit 310 may determine the presence or absence of the unlock operation including movement of the body of the user U or movement of an indication body such as a device held by the user U with its hand. In addition, movement of the head of the user U wearing the image display unit 20 may be used as the unlock operation. Moreover, an operation of patting the image display unit 20 or tapping the image display unit 20 may be used as the unlock operation. In this case, the CO control unit 310 can determine the presence or absence of the unlock operation on the basis of the detected value of the DP six-axis sensor 235, the DP magnetic sensor 237, or a touch sensor (not illustrated) mounted at the image display unit 20.

When the lock screen is being displayed (step S13; YES), the CO control unit 310 sets the display mode of the display system 1 to be the mirroring mode (step S14). The CO control unit 310 determines whether a condition for transitioning to the lock screen is met (step S15). The condition for transitioning to the lock screen includes, for example, a time when the operation of stopping displaying on the display system 1 using the switch 337 and the operation of resuming displaying on the display system 1 are consecutively performed.

When the condition for transitioning to the lock screen is met (step S15; YES), the CO control unit 310 waits at step S15. When the condition for transitioning to the lock screen is not met (step S15; NO), the CO control unit 310 determines whether an unlock operation has been performed (step S16). The unlock operation includes, for example, an operation of touching the touch panel 350 so as to trace a specific trajectory, or an operation of inputting a specific character string. When the unlock operation has not been performed or the operation performed to the touch panel 350 does not match the unlock operation, the CO control unit 310 makes a negative determination (step S16; NO). In this case, the CO control unit 310 determines the presence or absence of an event that ends the display of the display system 1 (step S17). The event that ends the display of the display system 1 includes, for example, removal of the HMD 100 from the control device 300, or the like. When the event that ends the display exists (step S17; YES), the CO control unit 310 determines whether the operation of the control device 300 ends (step S18). When the operation ends (step S18; YES), the CO control unit 310 executes an ending sequence to end this process. When the operation does not end (step S18; NO), the CO control unit 310 returns to step S12.

In addition, when the unlock operation is executed (step S16; YES), the CO control unit 310 moves to step S18.

When the event that ends the display of the display system 1 does not exist (step S17; NO), the CO control unit 310 returns to step S15.

On the other hand, when the lock screen is not displayed on the display system 1 (step S13; NO), the CO control unit 310 acquires information about the display mode executed immediately before step S12, in other words, information indicating the immediately preceding display mode (step S19). For example, the CO control unit 310 stores information indicating the current display mode in the non-volatile memory 313, and updates the information each time the display modes of the display system 1 are switched. The CO control unit 310 determines whether the immediately preceding display mode is the mirroring mode (step S20). When the immediately preceding display mode is the mirroring mode (step S20; YES), the CO control unit 310 moves to step S14.

When the immediately preceding display mode is not the mirroring mode (step S20; NO), the CO control unit 310 determines whether the immediately preceding display mode is the virtual device mode (step S21). When the immediately preceding display mode is not the virtual device mode (step S21; NO), the CO control unit 310 sets the display mode of the display system 1 to be the trackpad mode (step S22). When the CO control unit 310 determines the presence or absence of the event that ends the display of the display system 1 (step S23) and determines that the event that ends the display exists (step S23; YES), the CO control unit 310 moves to step S18. When the event that ends the display does not exist (step S23; NO), the CO control unit 310 continues the trackpad mode in step S23.

When the immediately preceding display mode is the virtual device mode (step S21; YES), the CO control unit 310 sets the display mode of the display system 1 to be the virtual device mode (step S31). Here, the CO control unit 310 determines whether or not the software keyboard is in a state of being used (step S32). When the software keyboard is not used (step S32; NO), the CO control unit 310 determines the presence or absence of the event that ends the display of the display system 1 (step S33). When the event that ends the display exists (step S33; YES), the CO control unit 310 ends the virtual device mode (step S34) and moves to step S18. When the event that ends the display does not exist (step S33; NO), the CO control unit 310 returns to step S31.

In step S32, the CO control unit 310 makes a positive determination, for example, when the screen displayed by the application 451 is a screen that requires character entry or when an instruction is given to enter a character due to the operation of the touch panel 350 (step S32; YES). In this case, the CO control unit 310 executes the software keyboard mode (step S35). The CO control unit 310 determines whether input through the software keyboard has been completed (step S36). When the input has been completed (step S36; YES), the CO control unit 310 returns to step S31.

When the input through the software keyboard has not been completed (step S36; NO), the CO control unit 310 determines the presence or absence of the event that ends the display of the display system 1 (step S37). When the event that ends the display exists (step S37; YES), the CO control unit 310 ends the software keyboard mode (step S38) and moves to step S18. When the event that ends the display does not exist (step S37; NO), the CO control unit 310 returns to step S36.

Figure 15:
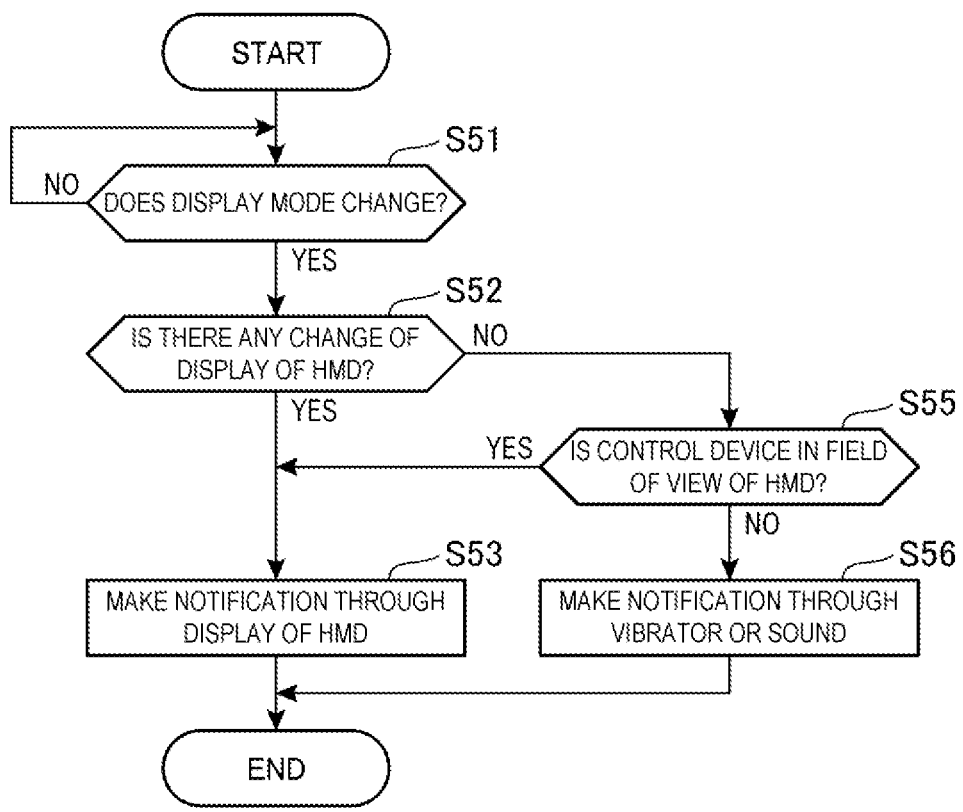
FIG. 15 is a flowchart illustrating an operation of the control device.

FIG. 15 is a flowchart illustrating an operation of the control device 300, and in particular, illustrating an operation of notifying switching of the display modes.

The CO control unit 310 determines the presence or absence of change of display modes during operations illustrated in FIGS. 13 and 14 (step S51). When no change of display modes is made (step S51; NO), the process waits at step S51. When the display mode is changed (step S51; YES), the CO control unit 310 determines whether or not the display of the display unit 205 is changed in association with the change of the display mode (step S52).

For example, when change is made from the mirroring mode or the expansion screen mode into the virtual device mode or the software keyboard mode, the display of the display unit 205 is changed. In addition, the same applies to change from the virtual device mode or the software keyboard mode into the mirroring mode or the expansion screen mode. In contrast, when change is made between the first, second, and third virtual device modes in the virtual device mode, or change is made from the virtual device mode into the software keyboard mode or vice versa, the display of the display unit 205 may not be changed.

When the display of the display unit 205 changes in association with the change of display modes (step S52; YES), the CO control unit 310 notifies, through the display of the display unit 205, that the display mode changes (step S53). For example, the CO control unit 310 generates display data for displaying a message that makes a notification of the switching of the display modes, and sends it to the HMD 100. Here, the CO control unit 310 may generate display data for displaying information related to the display mode before or after changing, and send it to the HMD 100.

When the display of the display unit 205 is not changed in association with the change of display modes (step S52; NO), the CO control unit 310 determines whether the control device 300 is in a field of view of the user U wearing the image display unit 20 (step S55). In step S55, the CO control unit 310 determines whether the control device 300 is located within the range of the external scene that the user U visibly recognizes with the outside light OL passing through the right light-guiding plate 26 and the left light-guiding plate 28. In other words, it is determined whether the user U is in a state of being able to view the display of the touch panel 350.

In step S55, the CO control unit 310 makes a determination, for example, on the basis of the imaging data on the DP outside camera 61 included in the HMD 100. In this case, the CO control unit 310 detects an image of the control device 300 from the imaging data, and identifies the position of the image of the control device 300 in the captured image, thereby making a determination.

When the control device 300 is in the field of view of the user U (step S55; YES), the CO control unit 310 moves to step S53, and makes a notification through the display of the display unit 205. When the control device 300 is not in the field of view of the user U (step S55; NO), the CO control unit 310 generates vibration using the vibrator 326 and/or outputs sound using the sound output unit 327, thereby making a notification of the switching of the display mode (step S56).

In step S53, when a notification of change of display mode is made through the display of the display unit 205, the CO control unit 310 may additionally use the vibrator 326 and/or the sound output unit 327 to make the notification. In addition, in step S53, when a notification of change of display mode is made through the display of the display unit 205, the CO control unit 310 may display a character or image that makes a notification of the change of display modes by using the touch panel 350.

Furthermore, as for a mode of the notification, the CO control unit 310 may generate vibration using the piezoelectric vibration unit provided in the control device 300, or may generate sound using the piezoelectric buzzer. In addition, the CO control unit 310 may generate both sound and vibration using the vibrator 326, the sound output unit 327, the piezoelectric vibration unit described above, and the piezoelectric buzzer described above. For example, the CO control unit 310 may generate sound such as buzzer sound, clicking sound, voice sound such as human voice, or the like, on the basis of audio data stored in the non-volatile memory 313 in advance. Furthermore, in addition to the notification through vibration or voice, the CO control unit 310 may make a notification through image display. For example, the display state of the image display unit 20 may be changed in synchronization with vibration or sound.

In addition, when the control device 300 is coupled by the communication unit 342 to an external audio output device such as headphones, speakers, or the like, the CO control unit 310 may perform communication using the communication unit 342 to make a notification through audio output using the external audio output device.

Furthermore, when the control device 300 is coupled by the communication unit 342 to an external device having a vibration generating unit, the CO control unit 310 may perform communication using the communication unit 342 to cause the external device to generate vibration, thereby making a notification.

Moreover, in addition to the output through vibration and sound, the CO control unit 310 may use blinking of an image displayed by the image display unit 20 or text display by the image display unit 20, thereby making a notification.

In addition, the control device 300 may have a light emitting unit using an LED or the like, and use lighting-up or flashing of the light emitting unit, thereby making a notification. This notification may be performed in addition to the output through vibration or sound, or in place of the output through vibration or sound. Furthermore, the image display unit 20 may include a light emitting unit using an LED or the like at a position where the user U can visually recognize in a state where the user U wears the image display unit 20. In this case, the image display unit 20 may make a notification by using this light emitting unit, in addition to the output through vibration or sound, or in place of the output through vibration or sound.

8. Operation and Effect of Embodiment

As described above, the display system 1 according to the embodiment to which the present disclosure is applied includes the HMD 100 including the image display unit 20, and also includes the control device 300 to be coupled to the HMD 100. The control device 300 includes the LCD 331 and the touch sensor 336 disposed so as to overlap with the LCD 331. The control device 300 executes switching between a plurality of user interfaces including the first user interface and the second user interface. With the first user interface, the first input screen is displayed on the LCD 331 to detect input performed to the touch sensor 336. With the second user interface, the second input screen is displayed on the LCD 331 to detect input performed to the touch sensor 336. The display system 1 makes a notification at the time of switching the user interfaces.

In the display method performed by the display system 1, the control device 300 switches and executes a plurality of user interfaces including the first user interface and the second user interface. With the first user interface, the first input screen is displayed on the LCD 331 to detect input performed to the touch sensor 336. With the second user interface, the second input screen is displayed on the LCD 331 to detect input performed to the touch sensor 336. The display system 1 makes a notification at the time of switching the user interfaces.

The program executed by the CO control unit 310 in the control device 300 switches and executes a plurality of user interfaces including the first user interface and the second user interface. With the first user interface, the first input screen is displayed on the LCD 331 to detect input performed to the touch sensor 336. With the second user interface, the second input screen is displayed on the LCD 331 to detect input performed to the touch sensor 336. The display system 1 makes a notification at the time of switching the user interfaces.

The first user interface corresponds, for example, to any of the mirroring mode, the expansion screen mode, the trackpad mode, the virtual device mode, and the software keyboard mode. The second user interface corresponds, for example, to a user interface other than the first user interface, the user interface being any of the mirroring mode, the expansion screen mode, the trackpad mode, the virtual device mode, and the software keyboard mode. The first input screen is, for example, any of the home screen 515, the operation screen 518, the trackpad screen 524, and the input device screens 531, 532, and 533, and the keyboard screens 542 and 543, and is a screen corresponding to the first user interface. The second input screen is, for example, any of the home screen 515, the operation screen 518, the trackpad screen 524, and the input device screens 531, 532, and 533, and the keyboard screens 542 and 543, and is a screen corresponding to the second user interface.

According to the display system 1, the display method performed by the display system 1, and the program described above, it is possible to inform the user U of a change of user interfaces at the time of switching plural display modes having an input method differing from the screen displayed on the touch panel 350. This enables the user U to reliably recognize switching of the user interfaces. Thus, with the display system 1 that allows the user U to view the display unit 205 and the touch panel 350, various types of user interfaces are displayed on the touch panel 350, which enables the user U to perform input operation with a high degree of freedom. In addition, for example, the user U can perform operations in a comfortable manner even when user interfaces are switched with an event other than an instruction made by the user U being the trigger. Thus, operability for the user U does not deteriorate even if user interfaces are changed in various types of modes in accordance with the operation state of the display system 1. This makes it possible to freely change plural user interfaces, which enables the user U to operate the display system 1 with a high degree of freedom.

At the time of switching the user interfaces, the display system 1 switches between a notification through the control device 300 and a notification through the image display unit 20 in accordance with a change of display of the image display unit 20, this change being associated with switching of the user interfaces.

For example, at the time of switching the user interfaces without accompanying the change of display of the image display unit 20, the display system 1 makes a notification through the control device 300, whereas at the time of switching the user interfaces, the switching being accompanied by the change of display of the image display unit 20, the display system 1 makes a notification through the HMD 100.

This configuration makes it possible to inform the user U of a change of the user interface in a manner that the user U can easily recognize at the time of switching plural display modes having an input method differing from the screen displayed on the touch panel 350. This enables the user U to reliably recognize switching of the user interfaces. For example, the user U can know any change of the user interface without carefully viewing the touch panel 350. Thus, it is possible to freely change plural user interfaces, which enables the user U to operate the display system 1 with a high degree of freedom.

The control device 300 includes the vibrator 326 and/or the sound output unit 327. At the time of switching the user interfaces without accompanying change of the display of the image display unit 20, a notification is made using the vibrator 326 and/or the sound output unit 327. In this manner, when the display of the display unit 205 does not change in association with a change of the user interface, it is possible to let the user U know about the change of the user interface. Thus, the user U does not need to carefully view the touch panel 350, and the user U can perform the input operation with a high degree of freedom.

At the time of switching the user interfaces, the switching being accompanied by change of display of the image display unit 20, the control device 300 may make a notification using the vibrator 326 and/or the sound output unit 327, and a notification through the image display unit 20. In this case, when the display of the display unit 205 changes in association with a change of the user interface, it is possible to more reliably let the user U know about the change of the user interface. For example, even when the user U does not carefully view both the display unit 205 and the touch panel 350, it is possible to let the user U know about the change of the user interface.

At the time of switching the user interfaces, the switching being accompanied by change of display of the image display unit 20, the control device 300 uses the image display unit 20 to display information related to the user interface of the LCD 331. This makes it possible to let the user U know about information regarding the changed user interface in association with the change of the user interface.

The HMD 100 is a head-mounted display apparatus that includes the image display unit 20 mounted on a head of a user. The image display unit 20 is a see-through type display unit that allows the external scene to pass through and enables an image to overlap with the external scene and to be visually recognized. When the control device 300 cannot be visually recognized through the image display unit 20 at the time of switching the user interfaces, the control device 300 makes a notification of switching of the user interfaces through the control device 300. This makes it possible to reliably let the user U know about the change of the user interface even when the user U cannot visually recognize the touch panel 350.

When the control device 300 can be visually recognized through the image display unit 20 at the time of switching the user interfaces, the control device 300 may not make a notification of switching of the user interfaces through the control device 300. In this case, the frequency of notification to the user U reduces without impairing operability. Thus, improvement in operability can be expected.

The display system 1 includes the HMD 100 including the image display unit 20, and also includes the control device 300 to be coupled to the HMD 100. The control device 300 includes the LCD 331 and the touch sensor 336 disposed so as to overlap with the LCD 331. The control device 300 includes the application executing unit 450 that executes the application 451 that uses detected data of the touch sensor 336. The control device 300 includes the kernel 410 that acquires detected data of the touch sensor 336. The control device 300 includes the HAL 430 that informs the application executing unit 450 of the input data 441 including the detected data of the touch sensor 336 and also of an operation event of the touch sensor 336. In accordance with the user interface displayed on the LCD 331, change is made to at least any of the type of the operation event and the detected data informed by the HAL 430 to the application executing unit 450.

This configuration makes it possible to provide the application 451 with different input data 442 by switching user interfaces. Thus, with the control device 300, it is possible to achieve user interfaces suitable for operations made by the user U or types of the application 451 to be executed. In addition, changing the input data 442 according to the user interfaces eliminates the need of changing the function or processing of the application 451 so as to meet the user interface. Thus, it is possible to change user interfaces even when the application 451 that is not ready for switching of user interfaces is executed. This makes it possible to freely change plural user interfaces without receiving any restriction resulting from specifications of the application 451, which enables the user U to operate the display system 1 with a high degree of freedom.

The present disclosure is not limited to the configurations described in the embodiments, and can be implemented in various modes without departing from the main point of the present disclosure.

For example, the display system 1 is configured, as one example, to include the HMD 100 serving as a head-mounted display apparatus. However, the present disclosure is not limited to this. It is possible to employ various types of display apparatus. For example, in place of the image display unit 20, another type of image display unit such as an image display unit to be worn like a cap may be employed. It is only necessary that the image display unit includes a display unit that displays an image corresponding to the left eye of the user U, and a display unit that displays an image corresponding to the right eye of the user U. In addition, the display apparatus according to the present disclosure may be configured, for example, as a head-mounted display mounted at a vehicle such as a car or an airplane. Furthermore, the display apparatus according to the present disclosure may be configured, for example, as a head-mounted display built into a body protector tool such as a helmet. In this case, the mounting portion can be set to a portion for positioning the apparatus with respect to the body of the user U, and a portion to be positioned with respect to the portion described earlier.

The HMD 100 is an example of the display apparatus to which the present disclosure is applied, and is not limited to the configuration illustrated in FIG. 3. For example, the embodiment described above gives an example in which the image display unit 20 and the connection device 10 are separately configured. However, it may be possible to employ a configuration in which the connection device 10 and the image display unit 20 are integrally configured, and are mounted at the head of the user U. In addition, the optical system of the image display unit 20 may have any configuration. For example, it may be possible to use an optical member disposed in front of the eye of the user U and overlapping with part of or all of the field of view of the user U. Alternatively, it may be possible to employ a scanning-type optical system that scans laser light or the like to make imaging light. Alternatively, the optical system is not limited to a system that guides imaging light within the optical system member. It may be possible to employ an optical system that only has a function of refracting and/or reflecting imaging light toward the eye of the user U to guide the imaging light.

In addition, as the display apparatus, it may be possible to employ a liquid crystal monitor or liquid crystal television that displays an image on the liquid crystal display panel. It may be possible to use a display apparatus that includes a plasma display panel or an organic EL display panel. In this case, the display panel corresponds to the display unit according to the present disclosure. Furthermore, a projector that projects image light onto a screen or the like may be used as the display apparatus.

In addition, for example, in the HMD 100 illustrated in FIG. 3, the connection device 10 may be configured by using a USB Type-C connector, a USB Type-C controller, and a USB hub. In this case, the DP outside camera 61 and other sensors may be coupled to the USB hub. In addition, an FPGA that outputs display data to the right display unit 22 and the left display unit 24 may be disposed at either the right display unit 22 or the left display unit 24, the FPGA serving as a controller that controls display of the right display unit 22 and the left display unit 24 of the image display unit 20. In this case, the connection device 10 may include a bridge controller that couples a USB Type-C controller and the FPGA. In addition, the image display unit 20 may be configured such that the DP six-axis sensor 235, the DP magnetic sensor 237, the EEPROM 215, and the like are mounted on the same substrate as the FPGA. The arrangement of the other sensors can also be changed as appropriate. For example, it may be possible to employ a configuration in which the distance sensor 64 and the DP illuminance sensor 65 are disposed at positions suitable for measurement or detection, and are coupled to the FPGA or the USB Type-C controller.

Furthermore, no limitation is placed on the specific specifications of the display apparatus including the OLED units 221 and 241. For example, the OLED units 221 and 241 may have a common configuration.

At least part of the functional blocks illustrated in FIGS. 3 and 4 may be achieved with hardware or may be achieved with a cooperation of hardware and software. These functional blocks are not limited to the configuration in which independent hardware resources are arranged in a manner illustrated in the drawings. In addition, a program executed by the processor 311 may be configured such that a program held in an external device is acquired through the communication unit 342 or the I/F unit 343, and is executed.

What is claimed is:

1. A display system comprising:
    a head-mounted display apparatus; and
    a control device that is coupled to the head-mounted display apparatus, wherein
        the control device includes:
            a display unit that displays a first input screen indicating a first operation and a second input screen indicating a second operation; and
            a touch sensor that is arranged in an overlapping manner with the display unit,
        the control device switches a first user interface and a second user interface, the first user interface in which the display unit displays the first input screen and the touch sensor detects a first input corresponding to the first operation, the second user interface in which the display unit displays the second input screen and the touch sensor detects a second input corresponding to the second operation, the head-mounted display apparatus includes a camera that captures an outside image, the control device determines whether the control device is in the outside image, when the control device is in the outside image, the head-mounted display notifies that the control device switches from the first user interface to the second user interface, and when the control device is not in the outside image, the control device notifies that the control device switches from the first user interface to the second user interface.

2. The display system according to claim 1, wherein, the head-mounted display apparatus display a first image and a second image different from the first image, and when the head-mounted display apparatus changes from displaying the first image to displaying the second image with a switching from the first user interface to the second user interface, the head-mounted display apparatus notifies with information with respect to the second interface.

3. The display system according to claim 1, wherein the control device includes a vibration generating unit or a sound output unit, and when the control device is not in the outside image, the control device notifies that the control device switches from the first user interface to the second user interface by the vibration generating unit or the sound output unit.

4. The display system according to claim 2, wherein the head-mounted display apparatus is a see-through type display unit that transmits an external scene and displays the first image and the second image so that the image is visually recognizable overlapping with the external scene.

5. A display method by a head-mounted display apparatus that includes a camera that captures an outside image and by a control device that is coupled to the head-mounted display apparatus, the control device includes a display unit that displays a first input screen indicating a first operation and a second input screen indicating a second operation and includes a touch sensor that is arranged in an overlapping manner with the display unit, the method comprising:

switching via the control device a first user interface and a second user interface, the first user interface in which the display unit displays the first input screen and the touch sensor detects a first input corresponding to the first operation, the second user interface in which the display unit displays the second input screen and the touch sensor detects a second input corresponding to the second operation, determining via the control device whether the control device is in the outside image, notifying via the head-mounted display device, when the control device is in the outside image, that the control device switches from the first user interface to the second user interface, and notifying via the head-mounted display device, when the control device is not in the outside image, that the control device switches from the first user interface to the second user interface.

6. A non-transitory computer-readable storage medium storing a computer-executable program for controlling a control device that is coupled to a head-mounted display apparatus that includes a camera that captures an outside image the control device includes a display unit that displays a first input screen indicating a first operation and a second input screen indicating a second operation and includes a touch sensor that is arranged in an overlapping manner with the display unit, the program switching via the control device a first user interface and a second user interface, the first user interface in which the display unit displays the first input screen and the touch sensor detects a first input corresponding to the first operation, the second user interface in which the display unit displays the second input screen and the touch sensor detects a second input corresponding to the second operation, determining via the control device whether the control device is in the outside image, notifying via the head-mounted display device, when the control device is in the outside image, that the control device switches from the first user interface to the second user interface, and notifying via the head-mounted display device, when the control device is not in the outside image, that the control device switches from the first user interface to the second user interface.

* * * * *